United States Patent Office 3,422,472
Patented Jan. 21, 1969

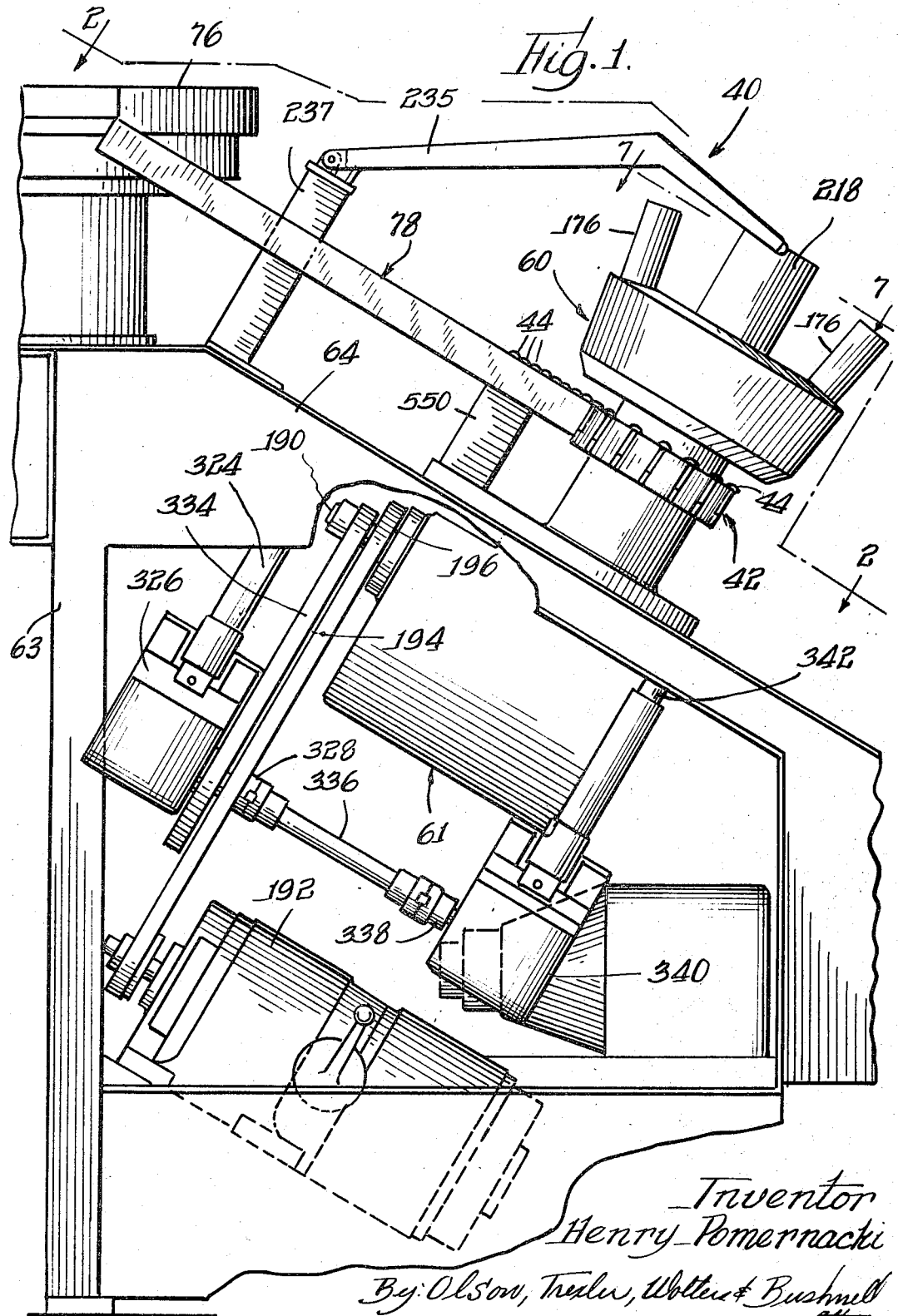

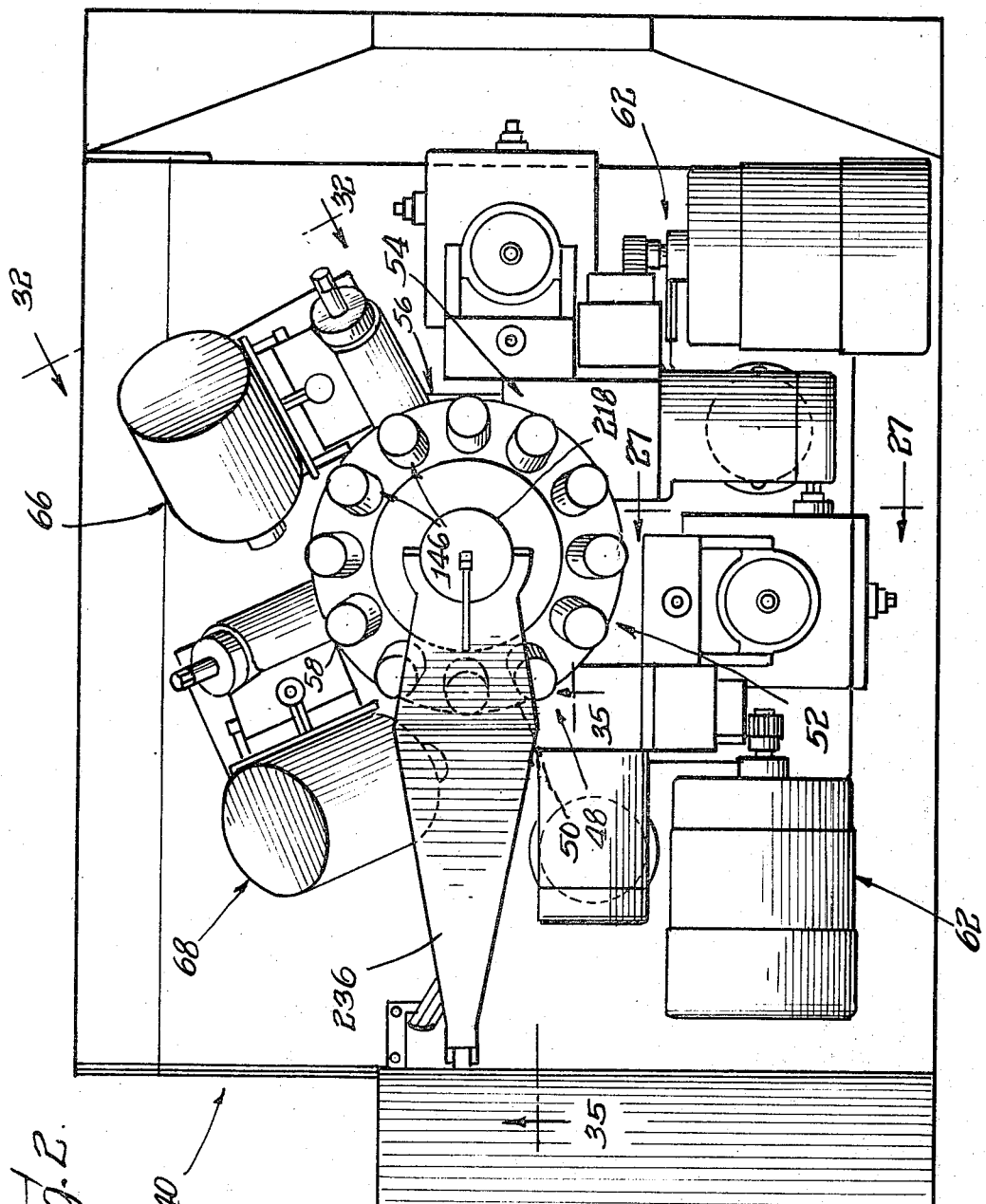

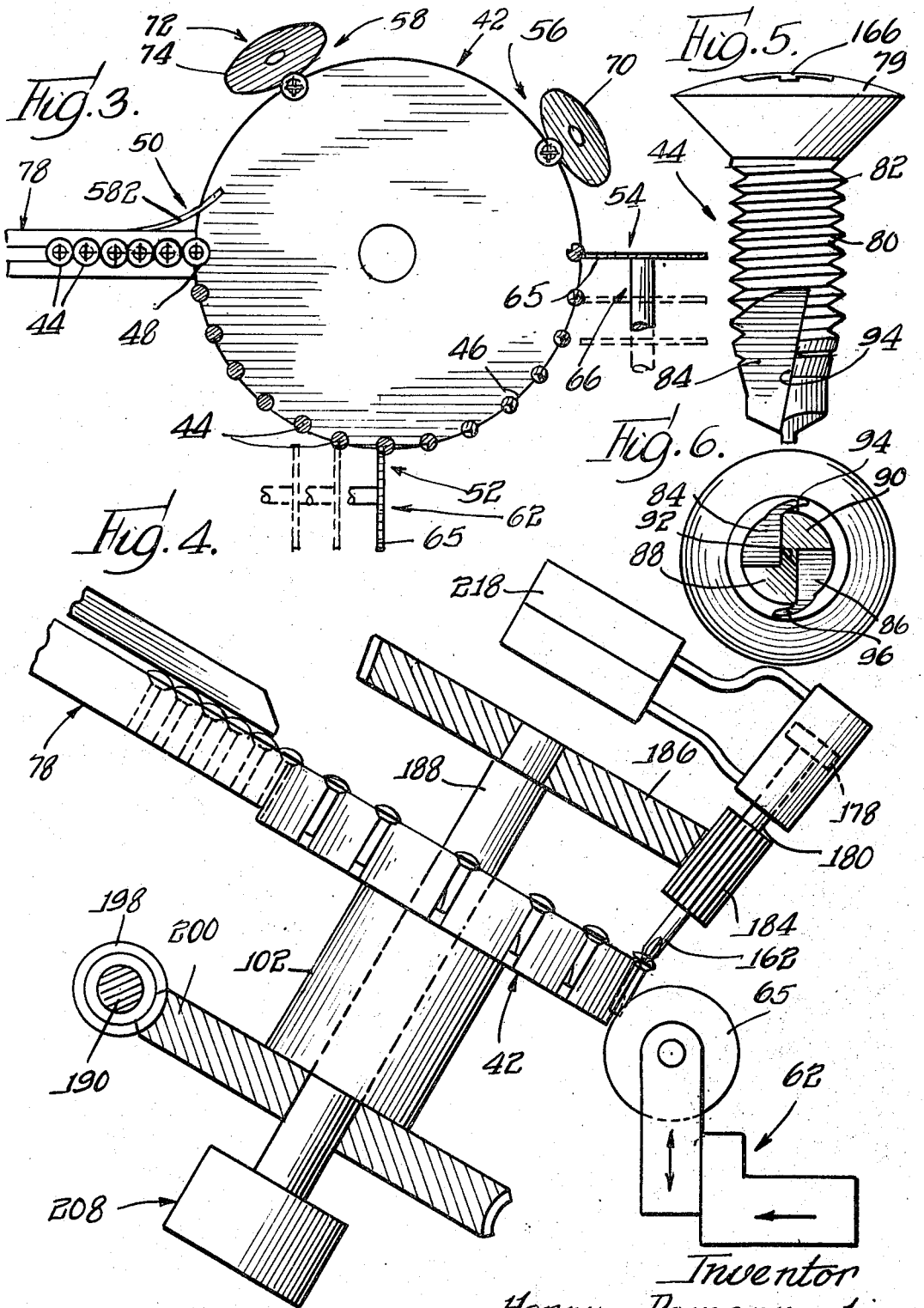

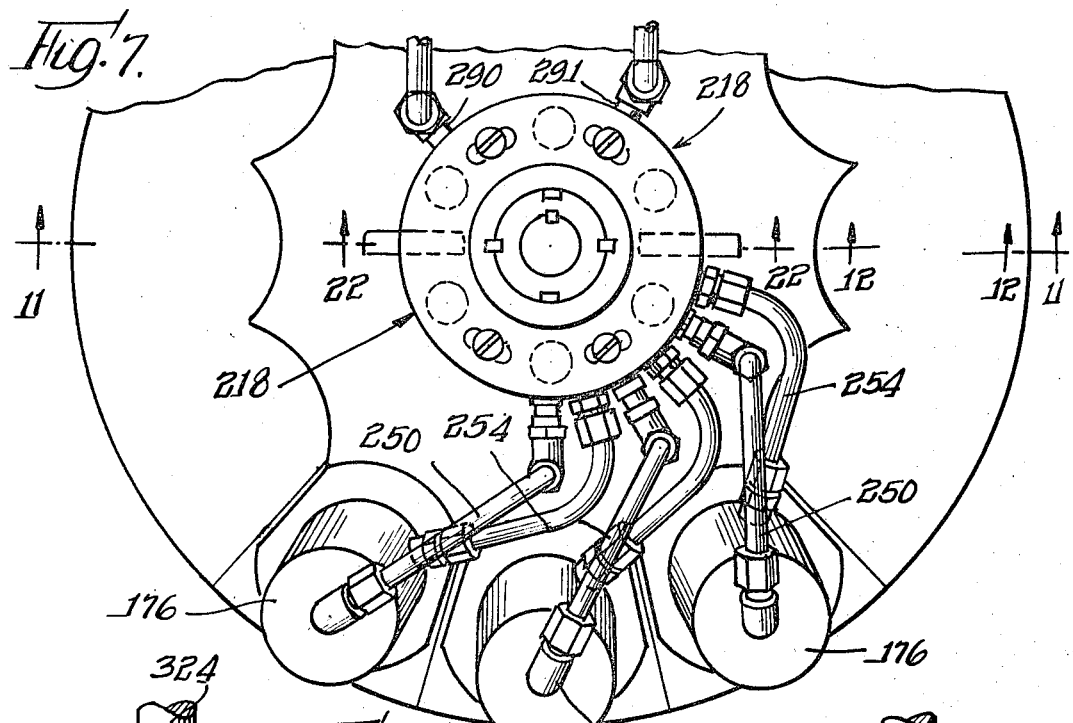
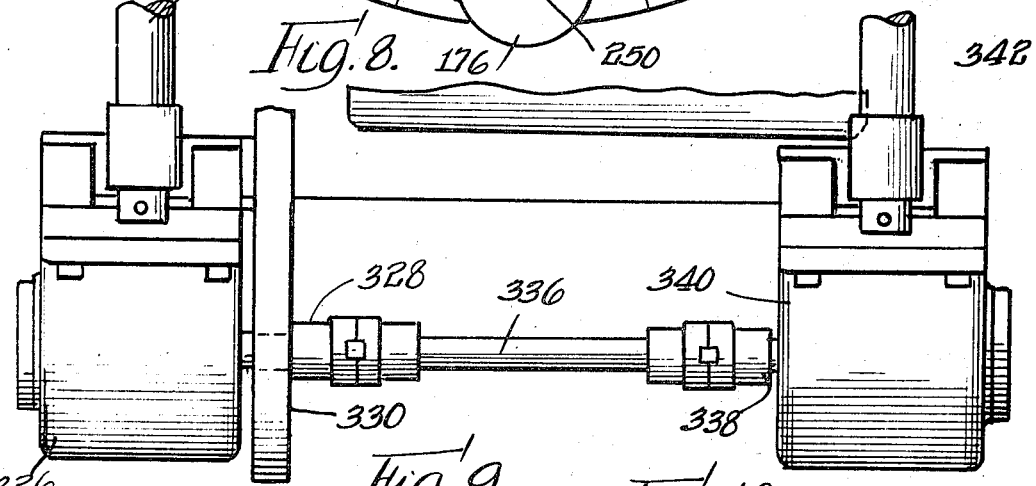
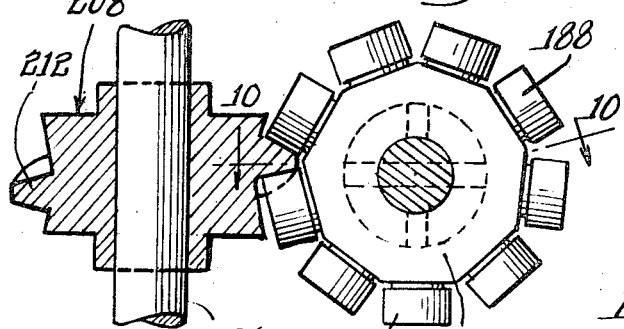
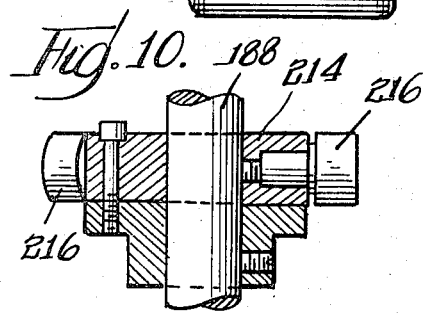

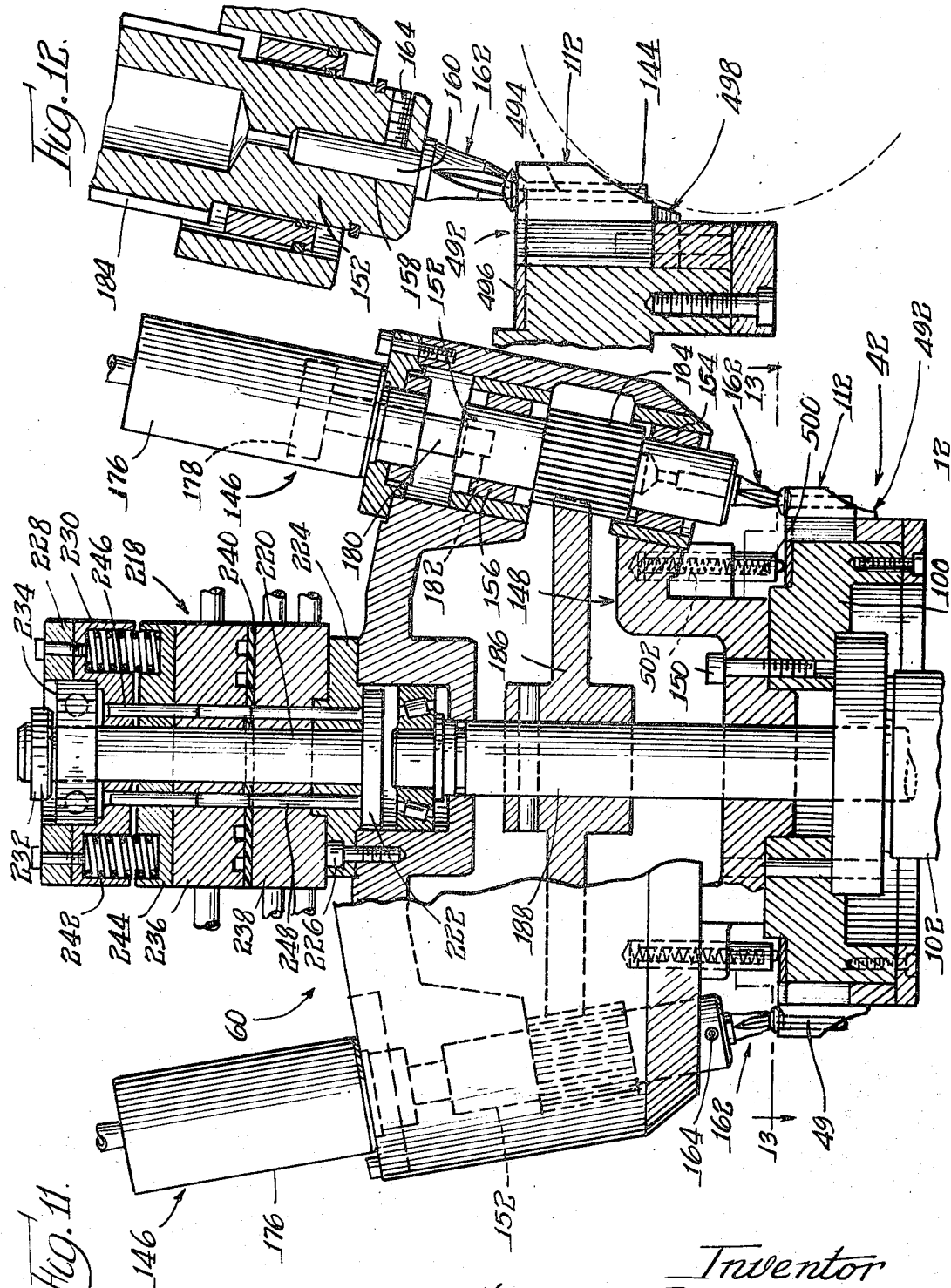

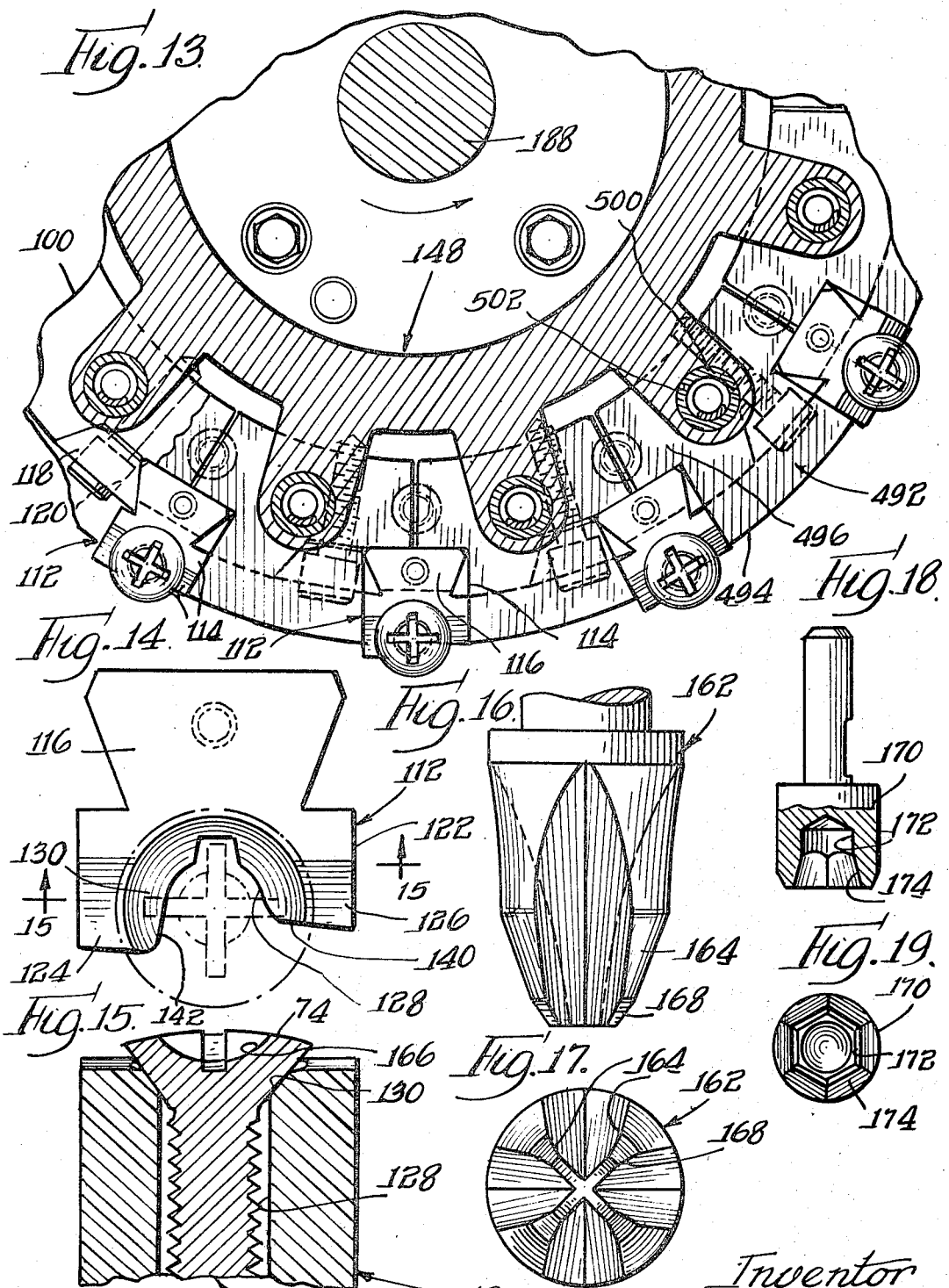

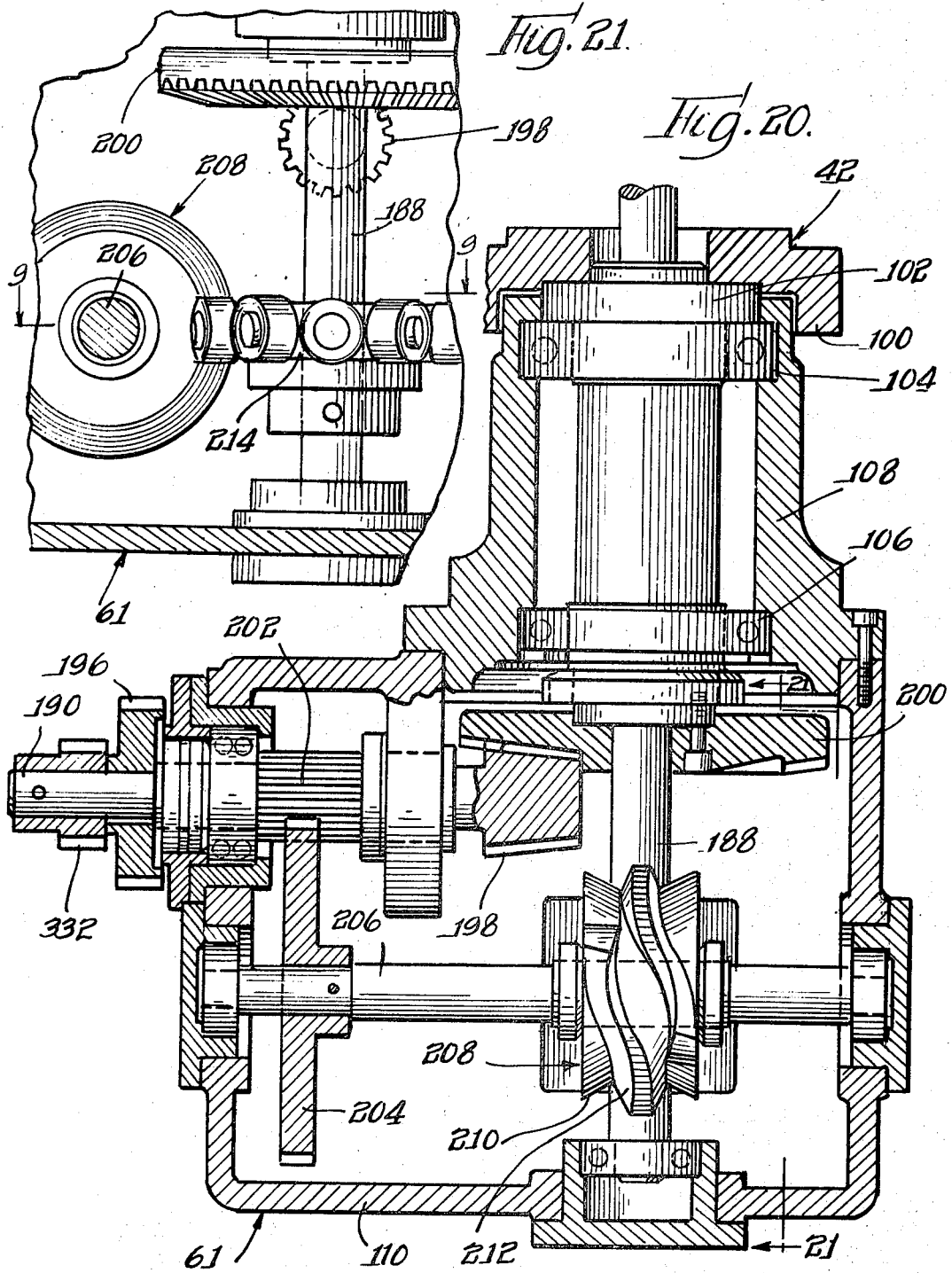

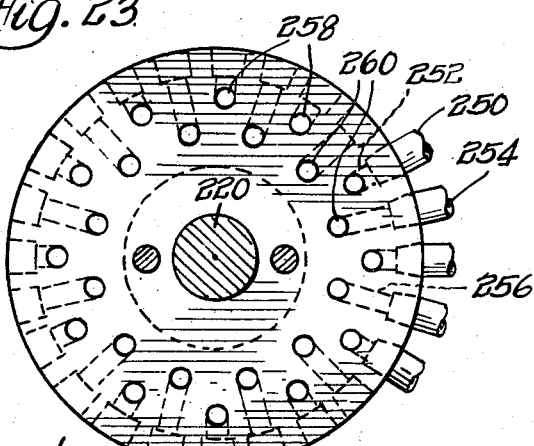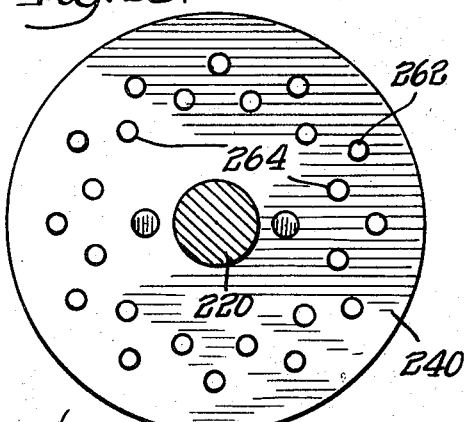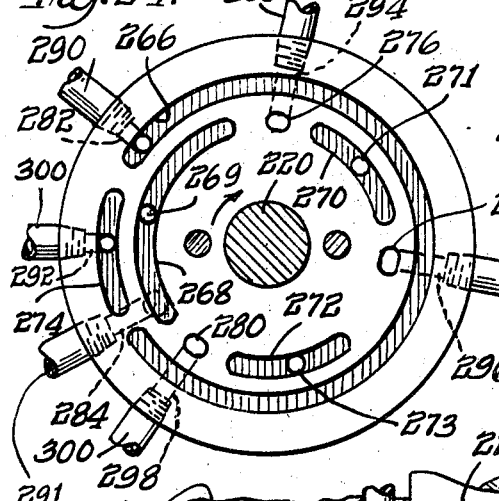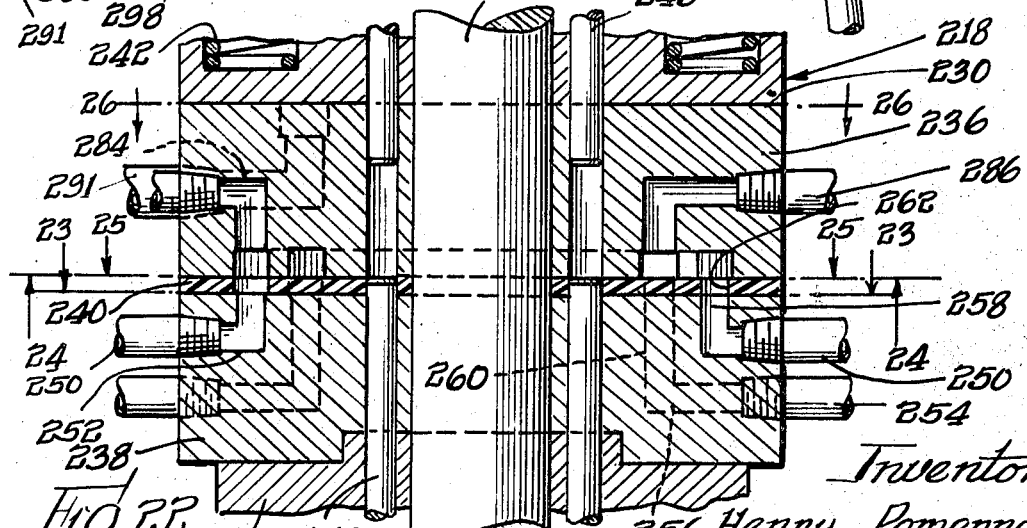

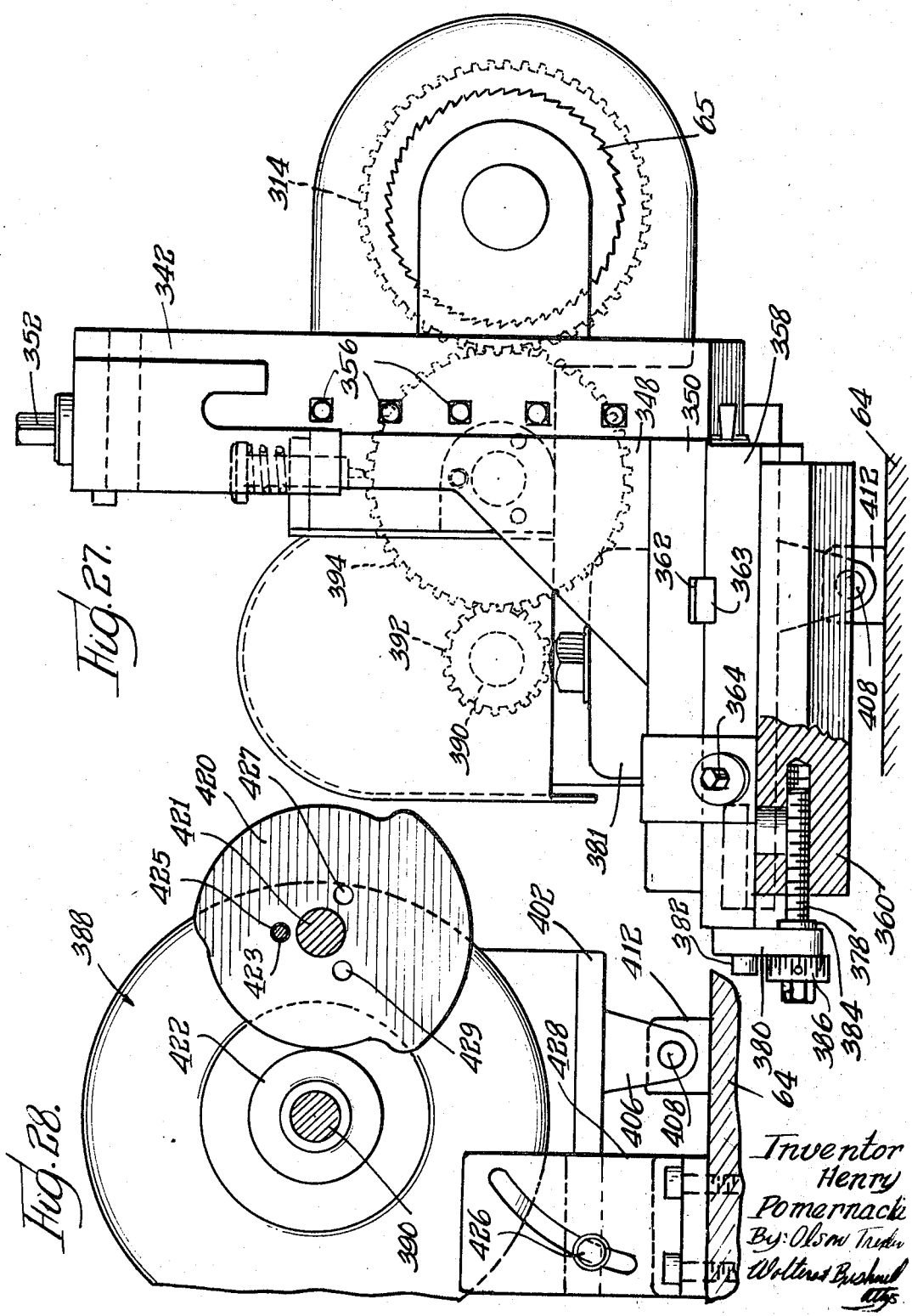

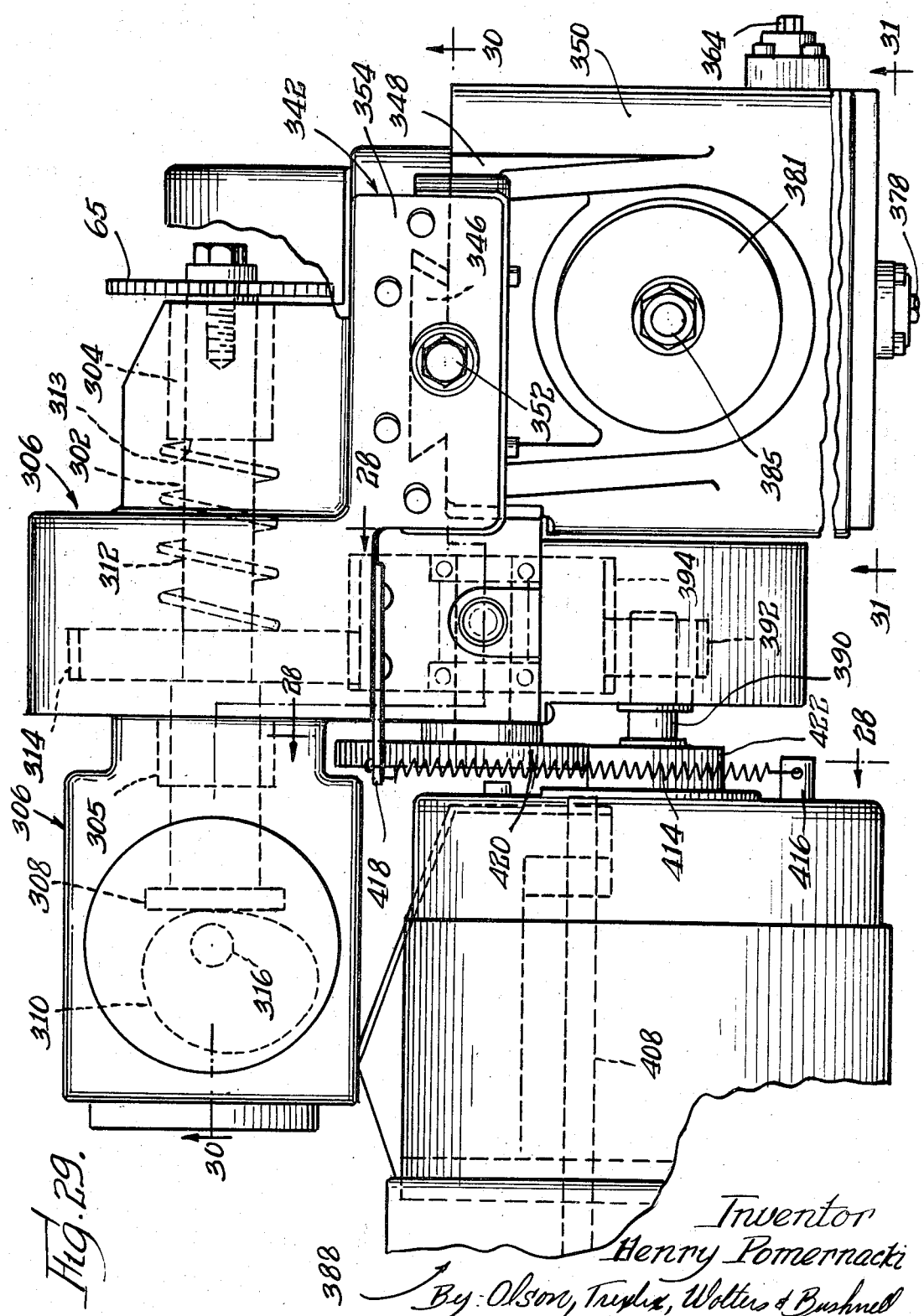

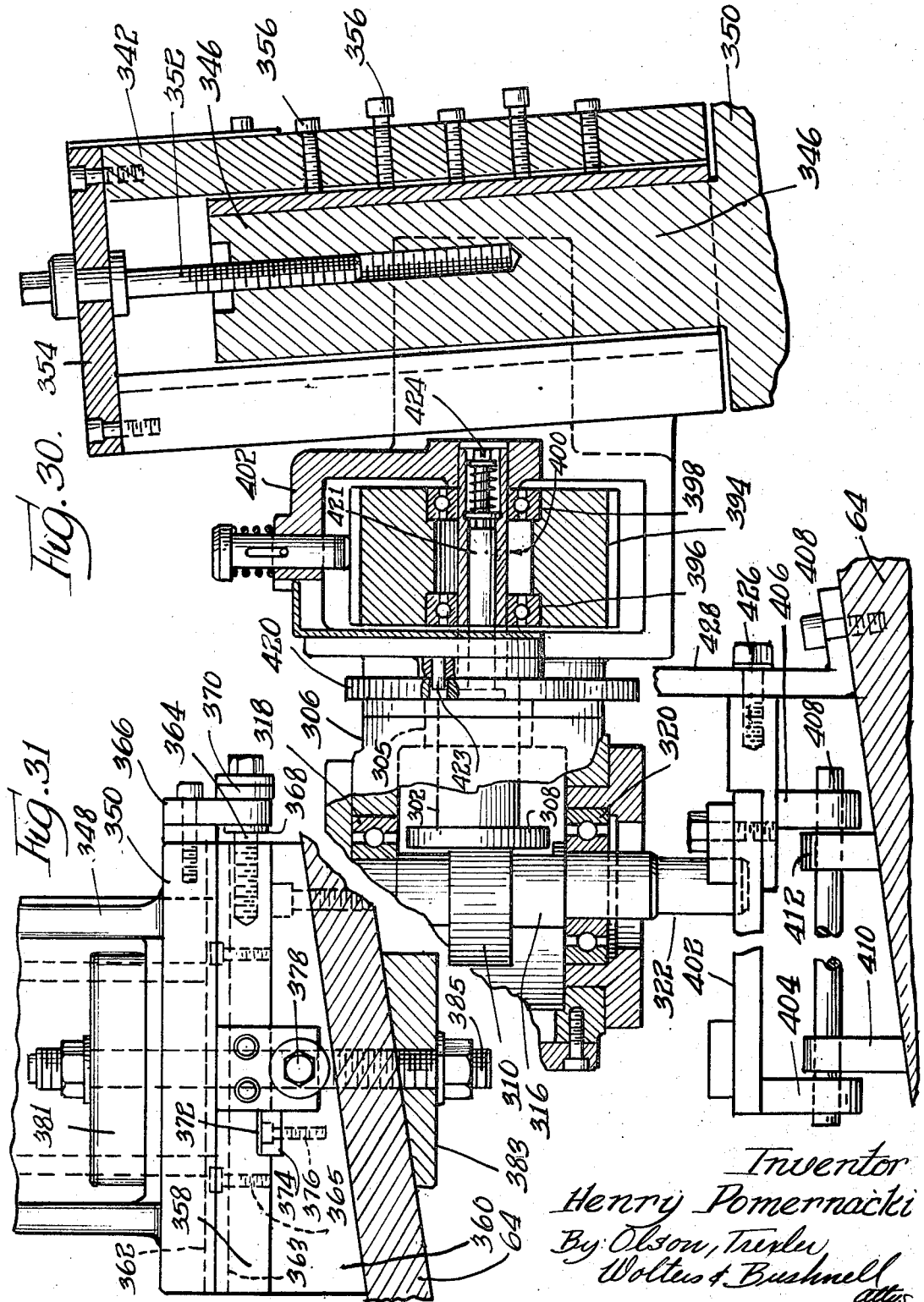

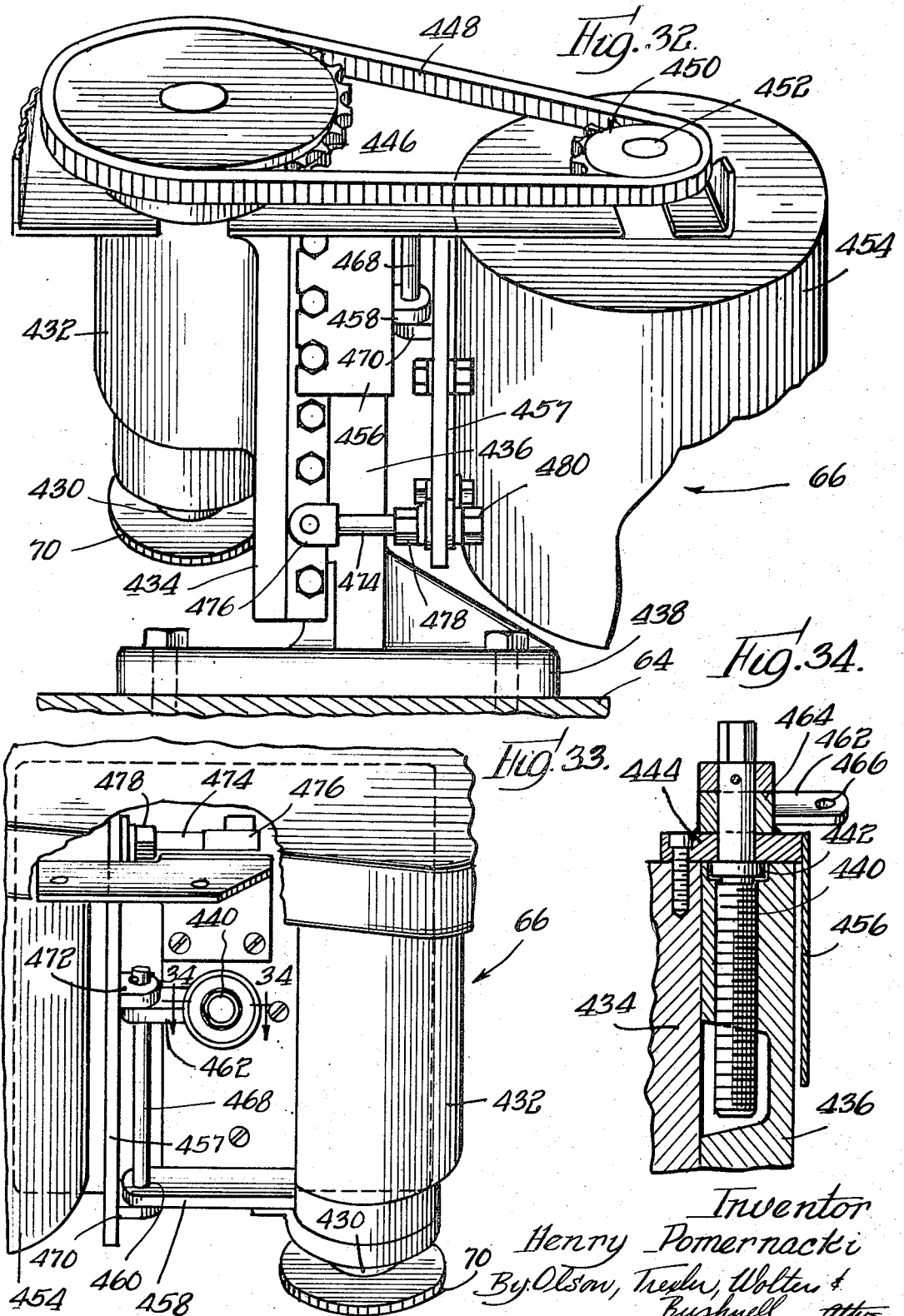

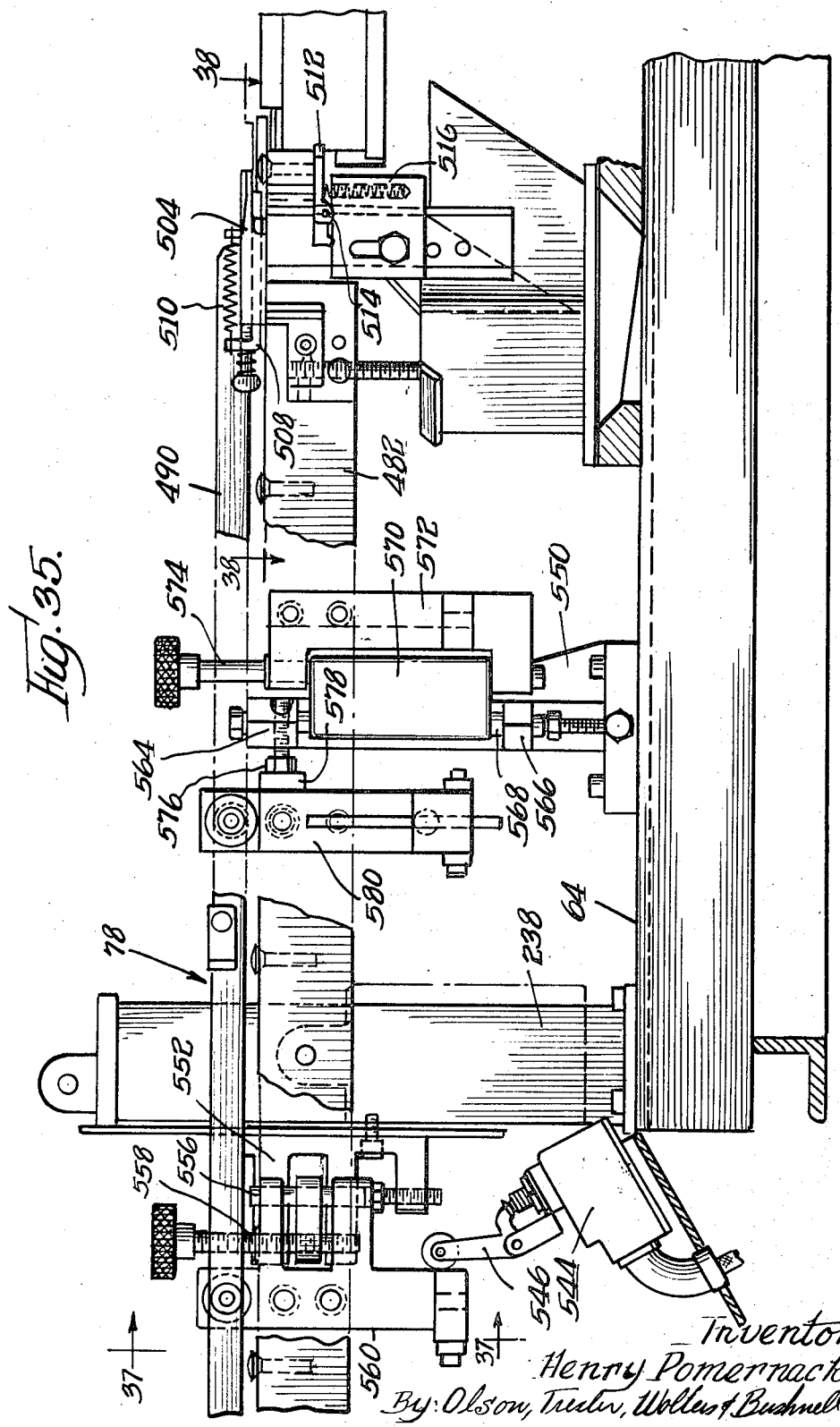

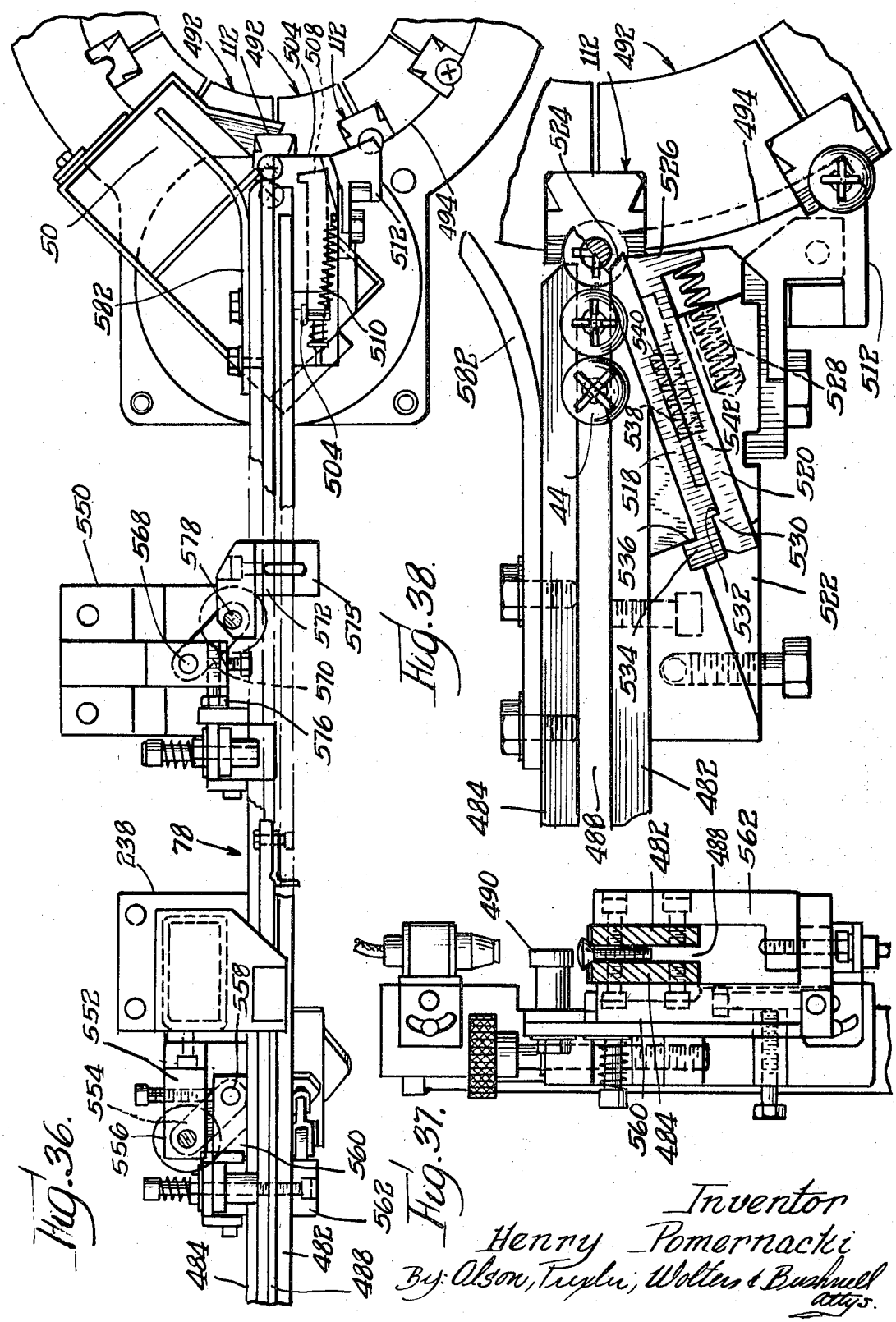

3,422,472
METHOD AND APPARATUS FOR MAKING DRILLING SCREW
Henry Pomernacki, Northbrook, Ill., assignor to Illinois Tool Works Inc., Chicago, Ill., a corporation of Delaware
Filed Aug. 5, 1966, Ser. No. 570,622
U.S. Cl. 10—10                                31 Claims
Int. Cl. B23g 9/00

The present invention relates to a novel method and apparatus for manufacturing fasteners, and more specifically to a novel method and apparatus for producing screws having slotted or fluted entering end portions.

While many features of the present invention may be adapted for producing a variety of screw structures, the method and apparatus contemplated herein are especially suitable for forming drilling and thread cutting screws. Certain heretofore suggested procedures and equipment for producing such screws have represented substantial improvements in the art, and the present invention contemplates significant further advances.

It is an important object of the present invention to provide a novel method and apparatus capable of substantially increasing production rates for slotted or fluted fasteners.

More specifically, it is an important object of the present invention to provide a novel method and apparatus for forming drilling and thread cutting screws rapidly and accerately while such screws are being advanced continuously along a predetermined path of travel.

A further important object of the present invention is to provide a novel method and apparatus for forming fluted or slotted fasteners which method and apparatus are readily adaptable for processing fasteners of different diameters.

Still another object of the present invention is to provide a novel apparatus for forming fluted or slotted screws and the like, which apparatus is constructed so as to facilitate easier and quicker setup or adjustment of the machine for processing a given workpiece.

A further object of the present invention is to provide a novel apparatus for producing slotted or fluted screws and the like, which apparatus is of relatively economical construction, utilizes relatively simple and inexpensive cutting tools and may be easily maintained.

Another specific object of the present invention is to provide a novel method and apparatus of the above-described type whereby workpieces or screw blanks are positively retained and rotated about their own axes while being advanced along a predetermined path of travel for accurately presenting predetermined portions thereof to cutting or forming tools disposed along the path of travel for promoting accurate and high speed processing of the workpieces.

A still further specific object of the present invention is to provide an apparatus of the above-described type having screw blank conveying means with novel and simplified mechanisms for delivering or feeding such screw blanks to the conveying means and for automatically responding to an improperly delivered screw blank so as to minimize any possibility of injury to the apparatus.

Still another object of the present invention is to provide a method and apparatus for forming slots or flutes in circumferentially offset portions of a fastener or screw blank in a manner such that the blank is substantially fully supported during the formation of each of such slots or flutes for enabling the slots or flutes to be cut more accurately and rapidly.

Other objects and advantages of the present invention will become apparent from the following description and accompanying drawings wherein:

FIG. 1 is a simplified partially broken away side elevational view showing an apparatus incorporating features of the present invention;

FIG. 2 is a plan view taken generally along line 2—2 in FIG. 1;

FIG. 3 is a schematic plan view showing the manner in which screw blanks are advanced from a loading station past a plurality of work stations to an unloading station in accordance with features of the present invention;

FIG. 4 is a fragmentary schematic elevational view showing a portion of the apparatus for conveying and manipulating successive screw blanks around a predetermined path of travel and past successive work stations.

FIG. 5 is an elevational view showing one form of a self-drilling and tapping screw which may be formed by the method and apparatus of the present invention;

FIG. 6 is an entering end view of the screw shown in FIG. 5;

FIG. 7 is an enlarged fragmentary and simplified plan view taken generally along line 7—7 in FIG. 1 and showing an upper end of screw blank conveying and positioning means incorporated in the apparatus of the present invention;

FIG. 8 is a fragmentary view showing a portion of the drive means incorporated in the apparatus for actuating slotting tools in timed relationship with the screw blank conveying means as will be hereinafter described;

FIG. 9 is a fragmentary view taken along line 9—9 in FIG. 21 and showing a portion of the drive means or transmission included in the apparatus for actuating and controlling screw blank positioning means as will hereinafter be described;

FIG. 10 is a fragmentary partial sectional view taken along line 10—10 in FIG. 9;

FIG. 11 is a partial sectional view taken generally along line 11—11 in FIG. 7;

FIG. 12 is an enlarged partial sectional view taken generally along line 12—12 in FIG. 7;

FIG. 13 is an enlarged fragmentary sectional view taken generally along lines 13—13 in FIG. 11;

FIG. 14 is an enlarged plan view showing a pocket member included in the conveying means or turret of the apparatus;

FIG. 15 is a fragmentary sectional view taken along line 15—15 in FIG. 14;

FIG. 16 is an enlarged elevational view taken generally along line 16—16 in FIG. 11 and shows a screw blank retaining and driver element or tool;

FIG. 17 is an end view of the driver element or tool shown in FIG. 16;

FIG. 18 is a view similar to FIG. 16 but shows a modified form of a driver element or tool especially suitable for use with hex head screw blanks;

FIG. 19 is an end view of the driver element or tool shown in FIG. 18;

FIG. 20 is a partial sectional view through a transmission unit included in the drive mechanism for the screw blank conveying and positioning means of the apparatus;

FIG. 21 is a fragmentary partial sectional view taken generally along line 21—21 in FIG. 20;

FIG. 22 is an enlarged fragmentary partial sectional view taken generally along line 22—22 in FIG. 7 and showing an air valve structure incorporated for controlling operation of screw blank orienting mechanism described hereinbelow;

FIG. 23 is a sectional view taken along line 23—23 in FIG. 22;

FIG. 24 is a sectional view taken along line 24—24 in FIG. 22;

FIG. 25 is a sectional view taken along line 25—25 in FIG. 22;

FIG. 26 is a sectional view taken along line 26—26 in FIG. 22;

FIG. 27 is an elevational view taken generally along the line 27—27 in FIG. 2 and showing a slot forming or sawing unit incorporated in the apparatus of the present invention;

FIG. 28 is a fragmentary partial sectional view taken generally along the line 28—28 in FIG. 29;

FIG. 29 is a fragmentary plan view of the portion of the apparatus shown in FIG. 27;

FIG. 30 is a fragmentary sectional view taken generally along line 30—30 in FIG. 29;

FIG. 31 is a fragmentary sectional view, partially broken away, taken generally along line 31—31 in FIG. 29;

FIG. 32 is a fragmentary elevational view taken generally along line 32—32 in FIG. 2 and shows a forming or sawing unit incorporated in the apparatus for forming tips of successive screw blanks;

FIG. 33 is a fragmentary plan view of the unit shown in FIG. 32;

FIG. 34 is a fragmentary sectional view taken generally along line 34—34 in FIG. 33;

FIG. 35 is a fragmentary elevational view partially broken away and taken generally along line 35—35 in FIG. 2 and showing mechanism constructed in accordance with features of the present invention for delivering or feeding successive screw blanks and loading such blanks on the conveying or turret means of the apparatus;

FIG. 36 is a fragmentary plan view of the portion of the apparatus shown in FIG. 35;

FIG. 37 is a fragmentary sectional view taken generally along line 37—37 in FIG. 35; and FIG. 38 is an enlarged fragmentary sectional view taken generally along line 38—38 in FIG. 35.

Referring now more specifically to the drawings wherein like parts are designated by the same numerals throughout the various figures, an apparatus 40 constructed in accordance with features of the present invention is shown in FIGS. 1 and 2. The apparatus comprises an endless conveyor or turret means 42 for advancing successive workpieces or screw blanks 44 around an endless path of travel 46 indicated schematically in FIG. 3.

The apparatus is constructed for providing a loading station 48 at which the workpieces or screw blanks are deposited on the conveyor means and an unloading station 50 where the processed screws are discharged. Between the loading and unloading stations are located work stations 52 and 54 at which slots or flutes are formed in the screw blanks and will be described below. Additional work stations 56 and 58 are spaced around the path of travel as indicated in FIGS. 2 and 3 at which portions of the screw blanks are formed to provide a pointed tip.

In accordance with a feature of the present invention the workpieces or screw blanks are positively retained on the conveyor or turret means 42 and they are periodically rotated about their own axes while being carried continuously by the conveyor for accurate presentation of predetermined portions thereof to forming or cutting tools at the various work stations. A workpiece retaining and orienting assembly 60 is mounted for rotation with and above the conveyor or turret for retaining and positioning the screw blanks in the manner just described.

The conveyor 42 and assembly 60 are continuously driven about a common axis by a transmission assembly 61. In the embodiment shown, the transmission assembly 61 is mounted beneath a top portion 64 of a main frame 63 of the apparatus while the conveyor or turret assembly 42 is disposed above the frame top portion. Preferably the frame top portion is inclined with respect to the horizontal and the vertical. More specifically, the conveyor or turret is mounted for rotation in a plane inclined with respect to the horizontal for facilitating feeding of the screw blanks thereto as will be described hereinbelow.

Mounted at the first work station 52 is a slotting or fluting unit 62 carrying a rotating saw 65. An identical unit 66 carrying another saw 65 is disposed at the second work station 54. Since these units are identical only one will be described in detail.

A tip forming or cutting unit 68 carrying a saw 70 is mounted at the work station 56 for forming a portion of a pointed tip on successive screw blanks. Another unit 72 carrying a saw 74 is mounted at the work station 58 for completing the formation of a pointed tip on successive screw blanks. The units 68 and 72 are identical so that only one of these uints need be described in detail.

A supply of screw blanks 44 is retained in a hopper 76 mounted on the machine frame 66 as indicated in FIG. 1. This hopper may be of various known construction. In order to deliver successive screw blanks from the hopper to the loading station 48, the apparatus is provide with a feeding or guide assembly 78. As will be hereinafter described, this assembly also includes means for stripping the finished workpieces or screws from the conveyor at the loading station 50.

While workpieces or screws of various constructions may be processed in accordance with the present invention, one form of a drilling and tapping screw which may be produced by the apparatus is shown best in FIGS. 5 and 6. The screw 44 has a head 79 and an elongated shank 80 provided with a plurality of integral helical thread convolutions 82. An entering end portion of the shank is formed with generally oppositely disposed slots or flutes 84 and 86 by the saws 62 and 64 at the work stations 52 and 54 respectively. Opposite side beveled surfaces 88 and 90 are formed by the saws 70 and 74 at the work stations 56 and 58 for providing the screw with a pointed tip. The arrangement is such that the beveled surfaces intersect each other along a straight line or ridge 92.

The slots or flutes 84 and 86 traverse the beveled surfaces 88 and 90 and a portion of the helical thread convolutions and thus present drilling and thread cutting edges 94 and 96. The slots extend generally axially of the shank but at the same time in oppositely inclined relationship with respect to the shank axis. Thus the cutting edges are inclined with respect to the axis of the screw for improving the cutting action.

The conveying or turret assembly 42 is shown in detail in FIGS. 4, 11, 12, 13, 14, 15 and 20. This assembly comprises a disc or main turret body member 100 fixed on and rotatable with the upper end portion of a hollow shaft or sleeve member 102. The sleeve member 102 is rotatably supported by bearing units 104 and 106 mounted within a housing portion 108 fixed to a main housing member 110 of the transmission assembly 61.

Spaced around the periphery of the disc or turret body member 100 are screw accommodating pocket members 112 shown in FIGS. 11-15. Peripheral seat means 114 are provided around the disc member for receiving the pocket members which have dove-tail shaped portions 116 and are removably secured to the turret body member by a wedge and screw elements 118 and 120. This arrangement enables the pocket members 112 to be easily and quickly removed and replaced. Thus the turret may be readily repaired or may be readily set up for receiving workpieces or screws of different sizes by substituting pocket members of different sizes.

As shown best in FIGS. 12-15, each of the pocket members 112 comprises a generally U-shaped portion 122 presenting legs 124 and 126 which define an axially elongated generally semi-circular seat 128 therebetween. The longitudinal axis of the seat 128 is substantially parallel to the rotational axis of the turret and the axial length of the seat 128 is preferably at least substantially as long as the shank of the workpieces or screw blanks to be processed so that such shanks are fully supported during the forming operations which will be hereinafter described.

An upwardly facing side of each pocket member is formed with a seat surface 130 adapted to accommodate and to conform with the underside of the head 79 of the a workpiece or screw being processed. As shown best in FIG. 14 the surface 130 is in the form of a segment of an annulus and extends in excess of 180° for insuring proper support of the screw. The upper surface is also beveled as shown for facilitating loading of a screw member.

The apparatus is constructed for loading screws into the pocket members while the turret is moving continuously in a counterclockwise direction as viewed in FIG. 13. In order to facilitate this loading operation, the pocket members are constructed so that the leg portions 126 thereof project radially of the turret a distance less than the radial extent of leg portions 124. This enables a screw blank to be delivered during continuous movement of the turret against a radially outwardly facing end surface 140 of a pocket member so that it will then be swept along with the turret by a side surface 142 of the longer leg portion 124. The loading operation of the screw members will be described more in detail below in connection with the delivery or feeding mechanism 78.

As shown in FIG. 12, a lower end portion of the leg section 124 of each pocket member is relieved as at 144 in order to avoid interference with the slotting saws.

The screw retaining and orienting assembly 60 is mounted on and rotates with the conveying means 42 as shown in FIGS. 1 and 11. The assembly 60 comprises annularly spaced driver units 146 carried by a housing 148 which is secured to the turret body member 100 by screws 150. The driver units 146 correspond in number to the screw accommodating pocket members and are positioned in general alignment therewith. It is to be noted however as is shown in FIGS. 11 and 12 that the driver units 146 are disposed at an angle with respect to the axis of rotation of the turret means and thus with respect to the longitudinal axis of their associated screw accommodating pocket member.

Each of the driver units 146 comprises a spindle 152 mounted for rotational and axial movement by bearing means 154 and 156. The lower end of the spindle is provided with a bore 158 for receiving a shank portion 160 of a screw retaining and driving tool 162 as shown in FIGS. 11 and 12. A set screw 164 threaded into the lower end of the spindle serves releasably to retain the tool.

The tool 162 is formed for engaging the head of a screw blank. In the embodiment shown in FIGS. 11, 12, 16 and 17, the tool includes cross-blade elements 164 which are complementary to an engageable crossed slot means 166 in the heads of the screws. Lower terminal ends of the blades 164 are beveled inwardly as at 168 for facilitating entry into the screw slot means.

FIGS. 18 and 19 show a tool 170 which may be substituted for the tool 162 in the event screws having hex heads rather than slotted heads are to be processed. The tool 170 has a hexagonally shaped socket 172 for accommodating hex heads of screw blanks. The socket has a flaring mouth portion 174 for facilitating proper engagement of the tool with the screw heads. It is to be understood that the apparatus may be adapted for accommodating screws having any desired head configuration or slot configuration by substituting for the tool 162 or 170 an appropriately shaped tool. In all events however, the tool is to be provided with either blade elements having inwardly beveled portions corresponding to the portions 168 or sockets having outwardly flaring portions corresponding to the mouth 174. This promotes initial proper engagement of the tools with the screw heads even though the tools are directed at an angle against the heads as shown in FIGS. 11 and 12. By positioning the tool at this angle, downward pressure on the tools not only holds the screw heads axially downwardly against the seats 130 of the pocket members, but also provides a radially inwardly directed force component which aids in holding the screws against the axially extending seat surfaces 128 of the pocket members.

Each of the units 146 comprises a double-acting air cylinder 176 having a piston 178 operable therein in axial alignment with the spindle 152. A piston rod 180 extends from the cylinder and is connected as at 182 to an upper end portion of the spindle in a manner for causing the spindle to move axially in unison with the piston and for permitting the spindle to rotate relative to the piston. The air cylinder is adapted to be actuated as hereinafter described for selectively urging the tool 162 downwardly and into engagement with the head of a screw located in an associated turret pocket member and for subsequently raising the tool for releasing the screw.

In accordance with a feature of the present invention the screws are rotated about their own axes and relative to the turret or conveyor means while being advanced from station to station around a path of travel so as to present predetermined different portions of the screw shank to the different saws at the different work stations. In order to accomplish the orientation of the screws in this manner, the spindles 152 are successively rotated about their own axes and fixed against rotation while their associated tools are in driving engagement with the screw members.

Each of the spindles 152 has a central gear portion 184 including axially elongated gear teeth. As shown in FIGS. 4 and 11, a large beveled gear 186 is arranged concentrically with the turret or conveyor means for simultaneous driving engagement with all of the gear portions 184 of all of the spindles 152. The gear 186 is fixed on and driven by a shaft 188 which extends downwardly through the hollow turret carrying and driving shaft 102 as shown in FIGS. 11 and 20. The transmission assembly 61 comprises means for driving the gear 186 and thus the screw orienting tools 162 in timed relationship with respect to the turret or conveyor means for accomplishing the previously described orientation of the screws.

The transmission 61 has an input shaft 190 which is driven from a suitable motor 192 or other prime mover as shown in FIG. 1 by a chain or timing belt 194 and gear 196 keyed on the shaft. A gear 198 is fixed on an inner end of the shaft 190 for driving a complementary gear 200 which is secured to the lower end of the hollow turrent supporting and driving shaft 102.

The input shaft 190 also carries and drives an elongated spur gear 202 which in turn drives gear 204 fixed on a rotatable shaft 206. The shaft 206 is driven continuously at a uniform speed as is the input shaft 190 of transmission assembly 61. A drive unit 208 shown in FIGS. 9, 10, 20 and 21 is provided between the continuously rotating shaft 206 and the shaft 188 for driving the shaft 188 for accomplishing the orientation of the screws relative to the turret as discussed above.

The drive unit 208 comprises a cam member 210 fixed on the shaft 206 and having a continuous generally helical thread-like cam element 212. A cam follower assembly 214 is fixed on the shaft 188 and presents teeth in the form of cam followers or rollers 216 mounted on radially extending pins for engagement with the thread-like cam element 212 of the member 210. The cam element 212 which has been described as being generally helical is formed in a known manner so that portions thereof have a predetermined lead angle for driving and rotating cam followers and thus the shaft 188 for forming the spindles 152 about their own axes. Other portions of the cam element 212 have a different lead angle for rotating shaft 188 at the same speed as the turret to prevent rotation of the screws about their own axes. The arrangement is such that the cam element 212 serves to drive the shaft 188 and rotate screw members about their own axes while such screw members are advancing along the path of travel between work stations. In addition, the construction of the cam element 212 is such that the shaft 188 is controlled so that the screw members are locked against rotation about their axes during movement of the screw members through a work station or, in other words, while the screw members are being acted upon by the saws.

In order to control the operation of the double-acting air cylinders 176 in timed relationship with respect to the rotation of the turret, the screw orienting assembly 60 includes an air control valve unit 218 shown in simplified form in FIGS. 1, 2, 4 and 11 and shown more in detail in FIGS. 7 and 22 through 26. Referring paticularly to FIGS. 11 and 22 it is seen that the valve unit 218 has a central shaft 220 having a flange 222 at a lower end thereof retained beneath a collar or bottom member 224 of the valve unit which is fixed to the housing 148 by screws 226. The valve unit is provided with interconnected upper end or head members 228 and 230 encircling the upper end of the shaft 220. The parts are retained in assembled relationship by nut 232 and bearing unit 234 which facilitates rotation of the shaft relative to the plates 228 and 230.

As shown in FIGS. 1 and 2 an arm 235 has one end anchored to a standard 237 mounted on the machine frame top 64 and an opposite end fixed to the head member 228 of the valve unit. The arrangement is such that the head members 228 and 230 are secured against rotation while the shaft 220 is free to rotate with the housing 148 of the orienting assembly 60.

The valve unit 218 includes valve blocks 236 and 238 having various ports or passageways therein as described below and being separated by a bearing valve disc 240. The disc may be formed from anti-friction material including plastic materials. A plurality of springs 242 acting between the fixed head member 230 and a pressure pad 244 serves to hold the mating surfaces of the disc 240 and the valve blocks together so as to minimize air leakage.

As shown in FIGS. 11 and 22 the valve block 236 is fixed against rotation by pins 246 extending into the members 230 and 244 while the valve member 238 and disc 240 are connected by pins 248 for rotation with the housing 148 and relative to the valve block 236.

Each of the double-acting air cylinders 176 has an upper end thereof connected by a conduit 250 with one of a series of ports 252 formed in the valve block 238 as shown best in FIGS. 7, 22 and 23. Similarly, the lower end of each double-acting air cylinder is connected by a conduit 254 with one of a series of ports or passageways 256 formed in the valve block 238. The generally radially extending passageways 252 and 256 respectively merge with axially extending passageways or ports 258 and 260. These passageways 258 and 260 register with apertures 262 and 264 respectively in the valve disc 240.

As previously indicated, the valve members 238 and 240 rotate with a turret means relative to the valve member 236. As this relative rotation takes place, the ports or aperures 262 and 264 successively pass into and out of communication with pressure and exhaust manifolds or ports formed in the valve block 236. Referring specifically to FIG. 24, it is seen that the lower face of valve block 236 is provided with pressure ports or manifolds 266, 268, 270 and 272 and with exhaust manifolds or ports 274, 276, 278 and 280. The pressure ports or manifolds are connected with a suitable source of air under pressure by passageways 282 and 284 in the block 238 which in turn communicate with branch lines 290 and 291 of an air conduit which extends to the pressure source, not shown. The pressure passageway 284 communicates with the manifolds 268, 270 and 272 through a manifold 286 formed in an upper side of block 236 as shown in FIG. 26. Manifold 286 is connected to manifolds 268, 270 and 272 by axially extending passages 269, 271 and 273 respectively.

The exhaust manifolds communicate with passages 292, 294, 296 and 298 which in turn communicate with suitably vented branch exhaust lines 300 at the upper side of the block 236.

The arrangement of the pressure and exhaust manifold and ports is such that, during rotation of the turret and screw orientation means, air under pressure is directed from pressure manifold 268 to the lower ends of the air cylinders 176 while such cylinders are moving past the unloading and loading stations 50 and 48. At the same time the upper ends of such cylinders are connected to exhaust manifold 247 so that the screw engaging tools 160 are held in a raised position at these stations. After a screw has been loaded in a pocket member at the station 48 and the turret has rotated to advance the screw a predetermined amount along the path of travel, the control valve serves to direct air under pressure from manifold 266 to the upper end of the associated cylinder 176 so that the adjacent tool 162 is forced downwardly into engagement with the head of the screw member. As shown in FIG. 24, pressure manifolds 266 and 268 overlap each other so that the pressure is initially retained in the lower end of the cylinders to provide a cushioning effect. The differential area of the piston caused by the piston rod projecting from one end thereof enables the pressure at the upper end of the cylinder to actuate the piston downwardly. The screw member is initially resiliently supported in the manner described below so that in the event the blade means or socket portion of the tool, as the case may be, is not properly aligned with the corresponding driving surfaces on the screw head, the screw will yield sufficiently under the pressure of the tool to prevent injury to either the screw or to the tool.

Upon continued advancement of the turret means, the tool 162 is roated by the gears 184 and 186 in the drive mechanism described above so as to bring the driving elements, whether blades or socket means into registration with the corresponding driving surface of the screw head. The screw is then positively controlled and oriented by the driver unit for presentation of different portions of the shank to the various saws at the different work stations.

When a screw approaches the first work station, the lower end of its associated air cylinder is connected with the exhaust port 276. Thus the counterbalancing or cushioning pressure in the lower end is relieved and the screw is tightly clamped against the turret pocket member so that it is prevented from slipping or turning while a slot is being cut therein.

Continued advancement of the turret causes the lower end of the cylinder associated with the slotted screw to be connected to the pressure manifold 270. This greatly reduces the effective clamping pressure on the screw so as to make turning of the screw by the orienting mechanism between work stations easier. When the screw reaches the second work station the lower end of its associated cylinder is again exhausted through port 278, so that the screw is tightly clamped while the second slot is being formed therein. Subsequently the counterbalancing pressure is reintroduced through manifold 272 while the screw is advanced through the third work station at which one of the beveled tip surfaces is formed. Similarly the screw is finally clamped at the last work station to insure precise location of the second beveled tip surface by again exhausting the lower end of the cylinder through port 280.

The unit 62 at the work station 52 for forming a slot in successive screw shanks is shown in FIGS. 2, 4 and 27 through 31. Referring particularly to FIGS. 27, 29 and 30, the slotting unit 62 comprises a spindle 302 on which the saw 65 is mounted. The spindle 302 is supported for both rotatable and axial movement by bearing means 304 and 305 in a housing assembly 306. As indicated by the broken line positions of the saw 65 in FIG. 3, the construction is such that the spindle is adapted to move axially for advancing the saw in timed relationship with the rotation of the conveyor or turret for thereby cutting the slot in the continuously advancing screw member.

The spindle 302 has a circular bearing pad or disc 308 secured to an end thereof for engagement with a cam 310. The cam is shaped so that when it is driven at a predetermined speed and in timed relationship with the turret as will be hereinafter described, the spindle is advanced from the retracted position shown in FIG. 29 for axially feeding the saw in timed relationship with the movement of the screw member. A spring 312 acting between an abutment 313 within the housing assembly 306 and an abutment on the spindle serves to maintain the pad 308 in engagement with the cam and to return the spindle to its retracted position. In the embodiment shown, the abutment on the spindle is provided by a gear 314 which is fixed to and serves to drive the spindle.

As shown in FIGS. 29 and 30 the spindle actuating cam 310 is carried by a shaft 316 rotatably supported within the housing assembly 306 by bearing means 318 and 320. A lower end portion 322 of the shaft 316 projects downwardly from the housing and is coupled with an output drive shaft 324 of a gear box or transmission 326 shown in FIGS. 1 and 8. The transmission 326 has an input shaft 328 carrying a sprocket or gear 330 which is driven from and in timed relationship with the input shaft 190 of the transmission 61. A small timing gear or sprocket 332 is fixed on the shaft 190 for driving a chain or timing belt 334 which encircles the sprocket or gear 330.

The input shaft 328 of the transmission 326 is coupled by shaft 336 as shown in FIGS. 1 and 8 with an input shaft 338 of a transmission 340. The transmission 340 is identical to the transmission 326 and has an output shaft 342 extending upwardly. As was previously indicated herein, the slotting unit 66 at the work station 54 is identical to the slotting unit 62 at the work station 52. In other words, the slotting unit at the work station 54 also has a spindle actuating cam, and the shaft 342 is connected to and drives the shaft of this cam. Thus, the saws at the work stations 52 and 54 are axially shifted between fully retracted and fully extended positions indicated in broken and solid lines in FIG. 3 and the movement of the spindles and the saws is in timed relationship not only with each other but also with the movement of the turret or screw conveying means.

Referring again specifically to the slotting unit shown in FIGS. 2 and 27 through 31, it is seen that means are provided for enabling the position of the spindle and thus the saw carried thereby to be adjusted axially and laterally and also generally vertically whereby the saw may be positioned for processing workpieces or screws of different lengths and diameters. More specifically, the housing assembly 306 comprises a generally upstanding slide portion 342 mounted on a generally upstanding dovetail guide 346 of a standard 348 integral with or mounted on a base plate 350. An adjusting screw 352 extends between an upper end member 354 of the slide portion 344 and the standard 348 for enabling an operator to adjust the housing assembly 306 and thus the spindle and saw in a generally up and down direction. The housing may be locked in the desired adjusted position by tightening set screws 356 shown in FIGS. 27 and 30.

The base plate 350 of the standard 348 rests on a slide plate 358 which in turn rests on a plate 360. The plate 360 is secured by suitable fastening means to the top 64 of the machine frame as shown in FIG. 31. The plate 360 has a wedge-shaped configuration so that the standard 348 and thus the saw spindle is supported at an angle to the top 64 and to the turret. The angle is such that the saw 65 rotates in a plane inclined to the axis of a screw shank at the work station 52 whereby to cut an inclined slot in the screw as shown best in FIGS. 5 and 6. The angle of the slot may be changed by substituting differently shaped wedges for the plate 360.

The base plate 350 has a slot 362 in a lower surface thereof which extends generally parallel to the longitudinal axis of the spindle 302. A guide bar 363 is secured by fastening means 365 to the plate 358, which guide bar projects into the slot 362. This enables the base plate 350 to slide in a controlled manner relative to the plate 358 and parallel to the axis of the spindle.

Adjustment of the base plate 350 relative to the plate 358 is accomplished by means of an adjusting screw 364 threaded into an aperture and the plate 358 and projecting freely through an aperture in a bracket 366 which is secured to the base plate 350 as shown in FIGS. 27, 29 and 31. The adjusting screw includes shoulder means 368 and 370 embracing opposite sides to the bracket 366 so that upon turning of the screw, the base plate 350 is shifted relative to the plate 358.

The lower surface of the plate 358 is formed with an elongated slot or groove 372 indicated best in FIG. 31, which groove is similar to the groove 362 but extends at right angles with respect thereto. A guide bar 374 is secured to the plate member 360 by similar fasteners 376 and projects into the slot or groove 372. This enables the plate member 358 which, of course, carries the standard 348 and the saw spindle to be adjusted relative to the fixed plate 360 and thus either toward or away from the periphery of the screw conveyor means or turret. This adjustment may be easily and accurately accomplished by means of adjusting screw 378 which is threaded into the plate 360 and which extends freely through a finger or bracket 380 secured by fastener 382 to a margin of the plate 358 as shown in FIGS. 27, 29 and 31. The adjusting screw 378 also includes shoulder means 384 and 386 embracing opposite sides of the bracket 380 so that rotation of the screw causes the plate member 358 to slide relative to the plate member 360. Means in the form of clamping pads 381 and 383 and bolt 385 are provided for releasably clamping the plates 350 and 358 in the desired adjusted position.

The screw slotting or fluting unit 62 includes an electric motor 388 for driving the saw spindle 302. As shown in FIGS. 27, 29 and 30, the motor has an output shaft 390 carrying a pinion 392. The pinion 392 meshes with an elongated idler gear 394 which is rotatably supported by bearing units 396 and 398 on a shaft 400 mounted in a portion 402 of the housing assembly 306. The gear 394 in turn meshes with and drives the gear 314 on the saw spindle 302. The elongated configuration of the gear 394 enables the gear 314 to slide therealong during axial shifting movement of the saw spindle.

The motor 388 is carried by a base plate 402 which, as shown in FIGS. 27, 29 and 30 has depending ears 404 and 406 pivotally supported on a shaft 408. The shaft in turn is mounted above the tabletop 64 by brackets 410 and 412 which may be welded or otherwise secured to the tabletop. By this arrangement, the motor is pivotally supported above the tabletop so that it is adapted to be adjusted for accommodating any adjustments of the housing assembly 306 carrying the saw spindle and gears 314 and 394. A spring 414 is connected between a pin 416 on the motor frame and a finger 418 secured to the housing assembly 306 for biasing the motor so as to position the pinion 392 for engagement with the gear 394.

In order to facilitate accurate setting of a desired minimum distance between the centers of the motor spur gear 392 and the idler gear 394 during setup or adjustment of the screw slotting unit, a cam 420 is mounted on a shaft 421 extending through the hollow shaft 400 for engagement with a portion 422 of the motor frame as shown in FIGS. 28, 29 and 30. A pin 423 projects from the housing for selective entry into holes 425, 427 and 429 in the cam for releasably locking the cam in the desired adjusted position. The shaft 421 has spring means 424 on an end portion for biasing cam 420 into engagement with the pin 423 in order to position the cam's peripheral surface for engagement with the abutment surface provided by the motor frame portion 422. This arrangement enables the pinion 392 to be accurately positioned for proper engagement with the gear 394 easily and quickly since the spring 414 will maintain the abutment surface against the cam. When the proper adjustment of the motor has been accomplished, the motor may be locked, if desired, in the adjusted position by tightening a screw 426 carried by the motor mounting plate 402 against a slotted bracket 428 fixed to the table top as indicated in FIG. 28.

The unit 68 for carrying and driving the saw 70 at the work station 56 is shown in FIGS. 2 and 32 through 34. The unit 68 comprises a spindle 430 which carries and drives the saw 70. This spindle is rotatably supported in a sleeve 432 by suitable bearing means, which sleeve is joined to or formed integrally with a slide 434. The dovetail slide is assembled with a complementary upwardly extending standard 436 which is joined to a base member 438 secured to the top 64 of the machine frame. As indicated in FIG. 33, the slide 434 and thus the saw 70 may be adjusted in a generally up and down direction by turning an adjusting screw 440 having a portion threaded into the standard 436 and having an abutment 442 engaging beneath a plate member 444 which is secured to and forms a part of the carriage or slide 434. The standard 436 is disposed so that its guideways are parallel to the longitudinal axes of the conveyor means screw accommodating pocket members and to the axis of rotation of the conveyor means. This up and down adjustment of the carriage or slide 434 adjusts the saw 70 longitudinally of workpieces or screw blanks on the conveyor means so that the apparatus is adapted to accommodate workpieces of different lengths.

The saw spindle 430 and thus the saw 70 is positioned for rotation about an axis inclined with respect to the guideways of the carriage 434 and complementary standard 436. This presents the saw rotating in a plane inclined with respect to the longitudinal axis of a screw carried by the conveyor in order to form the inclined end surface 88 or 90 on the end of the screw shank.

A sprocket 446 is keyed or otherwise secured to the upper end of the saw spindle 430 and is driven by a chain 448 which in turn encircles and is driven by a small sprocket 450 on an output shaft 452 of an electric motor 454. The motor is fixed to a mounting plate 457. This mounting plate is supported so that the motor will be adjusted along with the saw spindle and also in order to enable the tension in the belt or chain 448 to be adjusted. This is accomplished by providing a sheath-like member 456 which is shown best in FIGS. 32 and 34 and which is secured to the slide or carriage members 434 and 444 for movement therewith while at the same time extending around the standard 436.

A finger 458 having an aperture 460 therethrough is secured to the sheath 456 and a similar finger 462 is secured and projects from a spacer 464 mounted on the plate member 444. The finger 462 presents an aperture 466 in axial alignment with the aperture 460. A pivot shaft 468 extends through the apertures 460 and 466 and also through aligned apertures in ears 470 and 472 secured to and projecting from the motor mounting plate 457.

The axis of the pivot shaft 468 is parallel to the axis of the saw spindle 430 for permitting the motor 454 to be pivoted for adjusting the tension in the belt or chain 448. The motor is adapted to be secured in the adjusted position by an adjusting screw or link 474 which is connected to the slide member 434 by a pivot connection 476. The screw 474 extends through the motor mounting plate and carries nut elements 478 and 480 which may be turned for adjusting the position of the motor.

The assembly 78 for delivering or feeding screw blanks to the conveying means is shown in simplified form in FIG. 1 and in greater detail in FIGS. 35 through 38. This assembly comprises a pair of guiderails or track members 482 and 484 disposed in side by side spaced apart relationship so as to define a slot 488 therebetween. The track members are disposed for receiving successive screw blanks from the hopper 76 and directing the blanks to the conveyor loading station 48 shown in detail in FIGS. 36 and 38. As shown best in FIG. 37, the track members 482 and 484 present upwardly facing surfaces engageable beneath the heads of the screw blank. A guide or hold-down bar 490 is positioned slightly above the track members 482 and 484 so as to be engageable with the upper sides of the screw heads for insuring proper positioning of the screw members with respect to the track members.

As shown best in FIGS. 36 and 38, the feeding means is free of any gate or closure completely traversing the lower end of the slot 488. Thus the periphery of the conveying means or turret 42 serves as a gate at the lower end of the feed track. In this connection attention is directed to FIG. 13 as well as FIG. 36 which shows filler or spacer members 492 on the turret between the pocket members 112 and combining with the pocket members to define a peripheral surface 494 which is interrupted only by the inwardly extending seat or surfaces 128 of the pocket members and by the radially outwardly projecting leg portions 124 of the pocket members. With this arrangement, as long as the surface 494 provided by the filler member 492 and the end surfaces 140 of the leg sections 126 of the pocket members is in alignment with the slot 488 of the track assembly, the screw blanks are prevented from advancing from the track assembly. When a pocket or seat surface 128 moves into alignment with the slot 488 a screw blank advances from the track assembly into the seat and the projecting leg section 124 of the pocket member serves to sweep this screw member along with the turret while at the same time preventing advancement of the next successive screw member until the pocket member has cleared the track assembly.

As shown best in FIGS. 11, 12 and 13, each of the spacer members 492 has a top or horizontal extending flange portion 496 overlying the turret body member 100 between adjacent pocket members and a downwardly extending leg portion 498 which presents the aforementioned peripheral edge or surface 494. In order to retain the spacer members in position while enabling them to be easily removed and replaced, the turret assembly is provided with a plurality of spring biased plungers 500 shown in FIGS. 11 and 13. These plungers are carried in pockets 502 formed in a lower portion of the housing assembly 148. Lower ends of the spring-biased plunger releasably clampingly engage the flange sections 496 of the spacer members 492.

The feeding or delivery assembly 78 has means for insuring proper positioning of a blank within a turret pocket member and for minimizing any possibility of injury to the workpiece or jamming of the machine. This means comprises a plate member 504 shown in FIGS. 35 and 36 which is mounted at the side of and slightly above the guide or track member 482. A portion 506 of the plate member 504 projects over the loading station 48 for overlying and engaging if necessary the upper end or head of a screw blank while the blank is transferring from the slot 488 into the seat of a turret pocket member.

A wiper element 508 is slidably mounted beneath the plate member 504 and is biased by a spring 510 for engagement with heads of screw blanks as the screws move from the slot 488 along with the conveyor or turret. The wiping action causes these screws to rotate about their axes for aiding in orienting the heads thereof for engagement with the tool 162 or 170 of an adjacent driver unit 146.

A support platform 512 is mounted on pivot pin 514 and projects beneath the pocket members of the turret at the loading station 48 for engagement with lower ends of the screw members as shown in FIGS. 35, 36 and 38. The platform 512 is resiliently supported by a spring 516 shown in FIG. 35. The arrangement is such that the upper surface of the platform 512 engages the lower end of a screw member at the loading station 48 and initially supports this screw member so that the underside of its head is spaced slightly above the upwardly facing seat or surface 130 of its associated turret pocket member. In other words, the screw member is initially supported against the downward movement by the resiliently mounted platform 512 rather than by the rigidly mounted turret pocket member.

When the driver tool 162 or 170 is shifted downwardly by its associated air cylinder into engagement with the screw head, the platform 512 is adapted to yield under the pressure so as to prevent the screw member or the tool from being nicked or otherwise damaged. This yielding action is of particular benefit in the event the driving blade element or socket of the tool are not initially in proper alignment with the corresponding driving surfaces of the screw head.

In order to insure proper seating of the screw member shank in the seat of a turret pocket member and also in order to prevent the shank of a screw still in the slot 488 from interfering with a screw being carried away in the pocket member of a turret, gate and pressure pad members 518 and 520 respectively are slidably mounted on a support 522 fixed at the side of the track member 482. The gate member 518 has a beveled end portion 524 which does not project into the slot 488 but does provide a lateral passageway extending from the slot which in combination with the periphery of the turret, gradually narrows. As a screw member is picked up by a turret pocket at the loading station 48 its shank is moved into engagement with the beveled surface 524 which provides a camming action forcing the shank against the seat of the pocket member. The pressure pad 520 presents an elongated end or cam surface 526 adapted to engage the screw shank in a pocket and retain the shank until a driving tool of the screw orienting mechanism is forced into engagement with the screw head.

As shown best in FIG. 38, the pressure pad 520 is slidable relative to the gate 518 and is yieldably biased by a spring 528. An abutment 530 on the trailing end of the pressure pad is engageable with an abutment 532 on the gate member. In addition, the gate member has a flange or shoulder 534 which is engageable with a fixed stop surface 536 on the support means 522. Also as shown in FIG. 38, a compression spring 538 is disposed between a shoulder 540 on the gate member and a shoulder 542 on the pressure pad member. With this arrangement, the spring 528 normally biases the pressure pad toward the right as viewed in FIG. 38 and the pressure pad through the abutments or shoulder surfaces 530 and 532 normally biases the gate member toward the right. Movement of both members toward the right is limited by engagement of the shoulder 534 against the stop 536. In addition, the spring 538 acting between the gate member and the pressure pad member serves to bias these members so as normally to maintain their abutment or shoulder surfaces 530 and 532 in engagement with each other.

Slight mispositioning of a screw shank in the pocket may be accommodated and corrected by the resilient action of the gate and pressure pad members 518 and 520. In the event, however, that a screw member becomes excessively mispositioned and wedged, for example, between the longer leg section of a turret pocket member and the end of the track or guide members or the gate member, means is provided for stopping the machine and preventing injury thereto. More specifically, the track members are mounted for longitudinal movement away from the turret in response to forces created in the event a screw member becomes jammed in the manner just described.

As shown in FIG. 35, a switch 544 is mounted adjacent the track members, which switch has an arm 546 adapted to be actuated in response to movement of the track member away from the turret. The switch is connected in a suitable electrical circuit, not shown, with the main drive motor of the apparatus so as to stop the motor and thereby stop the turret in the event a screw member becomes twisted and jammed.

The track structure or guide chute is mounted so as to permit the previously described movement as shown best in FIGS. 35, 36 and 37. Upwardly extending standard 550 is mounted on the top structure 64 of the apparatus frame adjacent the previously mentioned standard 238. A hinge member 552 is secured to the standard 238 and is pivotally connected to one end of a link 554 by a pivot pin 556. An opposite end of the link 554 is connected by pivot pin 558 to a hinge member or bracket 560 which in turn is secured to and carries the track member 484. Another bracket member 562 is mounted on the bracket member 560 as shown best in FIG. 37 and in turn is secured to and supports the track or guide member 482.

Another hinge structure similar to that described above is carried by the standard 550 for providing a second point of support for the track or guide means. This hinge structure which is shown in FIGS. 35 and 36 comprises apertured finger elements 564 and 566 projecting from the standard 550 and supporting a pivot shaft 568 which in turn carries a link or hinge element 570. A bracket or hinge member 572 is pivotally connected to the link 570 by pin 574. The hinge member or bracket 572 corresponds to the hinge member 560 and is connected to and supports the track member 484. A bracket member 575 is mounted on the member 572. The bracket member 575 is similar to the bracket member 562 described above and is also secured to and supports the track member 482.

With the hinged connections between the standards and the track or guide means, the track members are adapted to swing about the pivot pins for generally longitudinal movement toward and away from the turret. As previously indicated the top 64 of the machine frame is inclined with respect to the horizontal and to the vertical. As shown in FIG. 1 the screw feeding track or guide means is disposed generally parallel to the top 64 or, in other words, the track is also inclined downwardly with respect to the horizontal. The pivot pins of the track support hinge means are arranged generally perpendicularly to the top 64 and thus at an angle to the horizontal and the vertical. This arrangement enables the track means to be biased by gravity toward the turret and to a normal predetermined advanced position. This position is controlled by an adjustable stop element or screw 576 on the standard 550 as shown in FIGS. 35 and 36 and engageable with an abutment 578 on a bracket 580 which is connected to and carried by the track member 584.

The process for forming screws is carried out with the apparatus hereinabove described and is in accordance with features of the present invention in the following manner. Screw blanks are advanced to the loading station 48 at which they are picked up by the continuously moving conveyor or turret. During initial movement of the screw blanks along with the turret or conveyor, the blanks are resiliently supported by the plate 512 while the tool 162 of the screw orienting driver units are brought into engagement with the screw heads. After this engagement is completed, the screws are positively held firmly against the seat surfaces of the turret pockets and the shanks of the screws are supported in the turret pocket members substantially throughout their length.

The screws are successively and continuously advanced along a predetermined path of travel by the turret or conveying means and past work stations 52, 54, 56 and 58. The screw blanks are held in predetermined position in the manner described above and, at the first work station designated by the numeral 52, predetermined side portions of the screw blank shanks are successively presented to the saw 65 of the slotting unit 62 as shown in FIGS. 3 and 4.

The saw is initially in the retracted position shown by the lefthand broken line representation in FIG. 3 and the saw spindle is advanced in timed relationship with the movement of the turret in the manner described above so as to be brought progressively into engagement with the screw shank as indicated by the intermediate broken line and solid line representations of the saw in FIG. 3. The saw spindle is supported for reciprocable movement along a straight line parallel to an imaginary plane tangent to the screw conveying means or turret or path of travel. The portion of the path of travel 46 between the loading station 48 and the work station 52 is directed at an angle to the rotational axis and line of feeding movement of the saw so that the conveying means or turret serves to feed the screw progressively into engagement with the saw as shown in FIG. 3.

As a screw passes from the work station 52, the orienting unit associated therewith is driven in a manner described above for rotating the screw substantially 180° about its own axis for presenting a side of the shank opposite from the first formed slot to the saw at the work station 54. The slotting unit at the work station 54 functions in the same manner as the unit at the work station 52 for cutting the second slot in the shank.

It is noted that the saws of the slotting units are shown in the simplified and partially schematic views of FIGS. 3 and 4 in positions such that their rotational planes are parallel to the axes of the screws. While the saws can, in some instances be positioned in this manner it is contemplated that the saws are mounted for rotation at angles with respect to the screw shanks for cutting the slots at angles as shown best in FIGS. 5 and 6. The angular support for the saw 65 is described in detail above.

The screws leaving the work station 54 are advanced to the saw 70 which is supported for rotation about an axis disposed in a plane extending generally radially with respect to and also substantially containing the axis of rotation of the turret. In addition the axis of rotation of the saws 70 is inclined with respect to the turret and the longitudinal axis of the screw carried thereby. The sawing unit at the work station 56 is offset circumferentially of a turret from the work station 54 about a desired amount which may, for example, be about 20° so that the beveled end face 88 is formed on successive screw shanks in a manner to position the ridge line 92 diagonally with respect to the slots or flutes formed in the shanks.

The screws are then advanced from the work station 56 to the work station 58 and during this advancing movement the orienting units are driven for rotating the screws substantially 90° about their own axes so as to present predetermined portions of the screws to the saw 74 for forming the end faces 90. The saw 74 completes the forming of the processing of the screws which are then continuously advanced to the discharge station 50.

As the screws approach the discharge station, the orienting units are actuated for raising the tools 162 and releasing the screws. The screws are then engaged by a guide element 582 mounted on the track assembly as shown in FIGS. 36 and 38, which guide element serves to strip the finished screws from the turret.

While a preferred embodiment of the present invention has been shown and described herein, it is obvious that many details may be changed without departing from the spirit and scope of the appended claims.

The invention is claimed as follows:

1. In an apparatus for forming shank tip portions of fastener devices, the combination comprising means for continuously conveying fastener devices having shanks along a predetermined path of travel, means for supporting a rotary slotting tool mounted at a work station for generally back and forth movement in a predetermined direction adjacent a first portion of said path of travel, said conveying means and said tool supporting means being mounted for relative movement toward each other at said first mounted for relative movement toward each other at said first path of travel portion for engaging a tool on the supporting means against a fastener device shank and forming a slot in said shank while the fastener device is continuously moving with the conveying means, and means for actuating said conveying means and said tool supporting means in timed relationship.

2. An apparatus, as defined in claim 1, wherein said conveying means comprises a series of pocket members for receiving and retaining successive fastener devices, each of said pocket members including an elongated seat portion for receiving and supporting one side of a fastener device shank substantially throughout its length and for exposing an opposite side of the fastener device shank for engagement by a rotary tool on said tool supporting means.

3. An apparatus, as defined in claim 1, wherein said tool supporting means comprises a rotary spindle for supporting a rotary tool, and means mounting said spindle for rotation and for substantially straight line reciprocable movement.

4. An apparatus, as defined in claim 3, wherein said means for actuating the conveying means and the tool supporting means in timed relationship comprises a shiftable cam engaging said spindle for axially feeding the spindle, and means for driving the cam and the conveying means in timed relationship.

5. An apparatus, as defined in claim 3, which includes means mounting said spindle for adjustment toward and away from the conveying means for adapting the apparatus to accommodate fastener devices of different sizes.

6. An apparatus, as defined in claim 5, which includes a motor disposed adjacent said spindle for driving the spindle, gear means adjustable with and drivingly connected to said spindle, additional gear means connected with said motor and drivingly engaging said first mentioned gear means, means shiftably supporting said motor for permitting adjustment of the motor in accordance with adjustment of the spindle and the first mentioned gear means, and adjustable abutment means between said motor and said first gear means for positively positioning said second gear means with respect to said first mentioned gear means.

7. An apparatus, as defined in claim 1, which includes means movable with said conveying means for turning fastener devices on the conveying means about their own axes and orienting the fastener devices in a predetermined manner, and means actuating said fastener device turning and orienting means in timed relationship with said conveying means.

8. An apparatus, as defined in claim 7, wherein said fastener device turning and orienting means comprises a spindle for holding a tool drivingly engageable with a fastener device, carrier means supporting said spindle for movement with the conveying means and also for rotation and axial movement with respect to the spindle axis and relative to the carrier means, means carried by the carrier means and connected with said spindle for axially moving the spindle for selectively shifting a tool held thereby into and out of engagement with a fastener device on the conveying means, and said last mentioned actuating means comprising means for selectively rotating the spindle for turning a fastener device associated therewith and for securing the spindle against rotation relative to the carrier means for preventing rotation of the fastener device about its axis.

9. An apparatus, as defined in claim 8, wherein said means for axially shifting the spindle comprises fluid pressure cylinder and piston means, and said last mentioned actuating means comprising means for directing fluid under pressure into the cylinder means for urging the spindle toward a fastener device with a predetermined high force for clamping the fastener device against the conveying means and for reducing said force during rotation of the spindle.

10. An apparatus, as defined in claim 8, which includes means for positioning fastener devices on the conveying means at a predetermined loading station, said positioning means including means for initially resiliently supporting the fastener devices while a tool carried by said spindle is moved into engagement with the fastener devices for minimizing any possibility of injury to the fastener devices.

11. An apparatus, as defined in claim 1, which includes means disposed adjacent said path of travel for forming pointed end surface means on successive shanks of fastener devices intersecting the slot formed in the shank at said first work station.

12. An apparatus, as defined in claim 1, which includes second means for supporting a second rotary slotting tool mounted at a second work station adjacent said path of travel for generally back and forth movement in a second predetermined direction adjacent a second portion of said path of travel, said conveying means and said second tool supporting means being mounted for relative movement toward each other at said second path of travel portion for engaging a tool on the second supporting means against a fastener device shank and forming a second slot in said shank while the device is continuously moving with the conveying means, and fastener device positioning and orienting means movable with a conveying means for turning the fastener devices about their own axes while the fastener devices are moving along the path of travel between said first and second work stations.

13. An apparatus, as defined in claim 12, which includes means at a third work station adjacent the path of travel for forming a beveled surface at ends of successive fastener device shanks, and means disposed at a fourth work station adjacent said path of travel for forming a second beveled end surface on successive fastener device shanks and intersecting said first mentioned beveled surface.

14. An apparatus, as defined in claim 1, wherein said conveying means comprises rotary means presenting a peripheral surface having a predetermined diameter, said conveying means including peripherally spaced pocket members having axially extending fastener device shank accommodating seats projecting radially inwardly from said surface and further including leg portions projecting from one side of said seats generally radially outwardly of said surface, and fastener device feeding means mounted adjacent said conveying means for directing fastener devices against said peripheral surface at a predetermined loading station, said fastener devices successively entering said seats and being swept from said feeding means by said projecting leg sections of the pocket members.

15. An apparatus, as defined in claim 14, which includes means mounting said feeding means for movement toward and away from said peripheral surface, said feeding means being urged away from the peripheral surface in the event a fastener member becomes twisted and jammed between the conveying means and the feeding means, and means responsive to movement of the feeding means away from the peripheral surface for stopping said conveying means.

16. In an apparatus for forming shank tip portions of fastener devices, the combination comprising conveyor means for advancing fastener devices having shanks along a predetermined path of travel and past a plurality of work stations, said conveyor means comprising a plurality of seat means spaced thereon for receiving and supporting fastener devices with portions of said shanks exposed, fastener device positioning and orienting means movable with said conveying means for selectively rotating the fastener devices about their own axes and relative to said seat means and for retaining the fastener devices against such rotation at said work stations, and means for driving said conveying means and said positioning and orienting means in timed relationship.

17. An apparatus, as defined in claim 16, wherein said positioning and orienting means comprises a series of driver units spaced around said conveying means and respectively associated with each of said seat means, each of said driver units comprising a spindle mounted for rotational and axial movement and being adapted to carry a fastener device engaging tool.

18. An apparatus, as defined in claim 17, which includes pneumatic pressure cylinder and piston means connected with each of said spindles for axially shifting the spindles, and control valve means connected with said cylinder means for urging said spindles toward fastener devices on said seat means with a relatively great force at said work stations and for reducing said force during rotation of the spindles and the fastener devices between work stations.

19. An apparatus, as defined in claim 17, wherein said means for driving the positioning and orienting means and the conveying means in timed relationship comprises a gear on each of said spindles, a large gear concentrically disposed with respect to said conveying means and engaging said spindle gears, and means for selectively driving said large gear for turning the spindles about their axes and for driving the large gear at the same speed as the conveying means for retaining the spindles against rotation about their own axes.

20. An apparatus, as defined in claim 16, which includes track means disposed adjacent said conveying means for directing fastener devices to the conveying means at a predetermined loading station, the fastener devices entering said seat means and being carried thereby from the loading station, means mounting said track means for shifting movement away from the conveying means, said track means being movable away from the conveying means in response to a fastener member becoming jammed between the conveying means and the track means.

21. An apparatus, as defined in claim 20, which includes means disposed laterally of said track means at said loading station for engaging fastener devices carried by the seat means from the track means and urging the fastener devices into the seat means.

22. An apparatus, as defined in claim 20, wherein said conveying means comprises a turret member, a plurality of pocket members replaceably mounted around a margin of said turret member and providing said seat means, each of said pocket members including leg sections at opposite sides of said seat means, one of said leg sections projecting radially outwardly to a predetermined diameter and the other of said leg sections projecting outwardly to a greater diameter, and spacer members replaceably mounted on said turret member between said pocket members and including portions providing the conveying means with a peripheral surface substantially on said one diameter, said peripheral surface retaining fastener devices in said track means until a pocket member moves into alignment with the track means.

23. An apparatus, as defined in claim 16, which includes means at one of said work stations for mounting a rotary saw for rotation about an axis inclined with respect to the shank axis of a fastener device at said one work station for cutting an inclined slot in said shank, means at another of said work stations for mounting another saw for rotation about an axis inclined with respect to the shank axis of a fastener device at said last mentioned work station for cutting a second slot in said shank, means at another of said work stations for mounting a rotary saw for forming a beveled end surface on a fastener device shank at said last mentioned work station, and means at still another of said work stations for mounting another rotary saw for forming a second beveled end surface intersecting said first mentioned beveled end surface on a shank at said last mentioned work station.

24. In a method of forming a shank tip of a fastener device, the steps comprising advancing a device having a shank along a predetermined path of travel, engaging cutting means at a work station adjacent said path of travel against a predetermined portion of said shank and forming a slot in the shank, engaging another cutting means at another work station adjacent said path of travel against said shank and further forming said tip, and rotating said device about the axis of its shank while moving the device along said path of travel between said work stations for presenting predetermined different portions of the shank to said first and second mentioned cutting means.

25. A method of forming a shank tip of a fastener device, as defined in claim 24, wherein said device is continuously advanced along said path of travel.

26. A method of forming a shank tip of a fastener device, as defined in claim 25, which comprises rotating said first mentioned cutting means in a single plane, and feeding said cutting means and said plane in a direction converging with said first mentioned portion of the path of travel and in timed relationship with the advancing movement of said device for engaging the first mentioned cutting means with said shank.

27. A method of forming a shank tip of a fastener device, as defined in claim 26, comprising rotating said second mentioned cutting means in a single plane, and feeding said second mentioned cutting means and said second mentioned plane in a direction converging with said second mentioned portion of the path of travel and in timed relationship with the advancing movement of said device and engaging said second mentioned cutting means with said shank and forming a second slot in the shank circumferentially offset from said first mentioned slot.

28. A method of forming a shank tip of a fastener device, as defined in claim 26, comprising holding said second mentioned cutting means in a fixed position and advancing said shank into engagement with said cutting means for forming a pointed tip.

29. A method of forming a shank tip of a fastener device, as defined in claim 24, comprising supporting said shank substantially throughout its length and oppositely from the point of engagement by said first mentioned cutting means.

30. A method of forming a shank tip of a fastener device, as defined in claim 24, comprising clampingly engaging said device and restraining the device against rotation about the axis of its shank during engagement of the cutting means with the shank.

31. A method of forming a shank tip of a fastener device having a head, as defined in claim 30, comprising supporting the shank of said device by first laterally opening seat means and supporting the head of said device on upwardly facing laterally opening seat means, and directing a clamping force downwardly and diagonally inwardly against said head for urging the shank against said first mentioned seat means and clamping the head against said second mentioned seat means.

References Cited

UNITED STATES PATENTS

| | | | |
|---|---|---|---|
| 2,540,058 | 1/1951 | Stern | 10—2 |
| 2,561,966 | 7/1951 | Baumle | 10—2 |
| 2,621,343 | 12/1952 | Fray | 10—6 |
| 2,657,402 | 11/1953 | Poupitch | 10—6 |
| 3,085,264 | 4/1963 | Stern | 10—169 |
| 3,164,851 | 1/1965 | Hanneman | 10—10 |
| 3,280,412 | 10/1966 | Hanneman et al. | 10—10 |

CHARLES W. LANHAM, *Primary Examiner.*

E. M. COMBS, *Assistant Examiner.*

U.S. Cl. X.R.

10—2, 6